United States Patent
Paschall et al.

(10) Patent No.: US 12,460,995 B1
(45) Date of Patent: Nov. 4, 2025

(54) SYSTEMS AND METHODS TO TEST PERCEPTION AND SAFETY RESPONSES OF AUTONOMOUS MOBILE ROBOTS

(71) Applicant: Amazon Technologies, Inc., Seattle, WA (US)

(72) Inventors: Stephen Charles Paschall, Acton, MA (US); Justin Croyle, Kalispell, MT (US)

(73) Assignee: Amazon Technologies, Inc., Seattle, WA (US)

( * ) Notice: Subject to any disclaimer, the term of this patent is extended or adjusted under 35 U.S.C. 154(b) by 509 days.

(21) Appl. No.: 17/707,383

(22) Filed: Mar. 29, 2022

(51) Int. Cl.
  *G01M 17/007* (2006.01)
  *B25J 9/02* (2006.01)
  *G05D 1/00* (2024.01)

(52) U.S. Cl.
  CPC ...... *G01M 17/0072* (2013.01); *G05D 1/0238* (2013.01); *B25J 9/026* (2013.01)

(58) Field of Classification Search
  CPC .......... G01M 17/007; G01M 17/0072; G01M 17/065; G06F 30/20; G06T 2207/30252; G05D 1/0238; G05D 1/622; G05D 1/628; G05D 1/633; B25J 9/026
  See application file for complete search history.

(56) References Cited

U.S. PATENT DOCUMENTS

| 2003/0208302 A1* | 11/2003 | Lemelson | G05B 19/19 700/245 |
| 2022/0057481 A1* | 2/2022 | Aono | G01S 7/40 |
| 2022/0244142 A1* | 8/2022 | Breton | H04N 23/90 |

FOREIGN PATENT DOCUMENTS

GB        2557252 A  *  6/2018  ............ B60W 50/04

OTHER PUBLICATIONS

Salas-Espana, Natali V. The design and safety analysis of an accessible low-cost differential drive robot under LIDAR-Based obstacle avoidance. Diss. 2021. (Year: 2021).*

* cited by examiner

*Primary Examiner* — Peter J Macchiarolo
*Assistant Examiner* — Timothy P Graves
(74) *Attorney, Agent, or Firm* — Athorus, PLLC

(57) ABSTRACT

Systems and methods to test autonomous mobile robots (AMRs) may include a dynamometer, a robotic system carrying an object, and a control system. An AMR under test may be positioned on the dynamometer and instructed to perform navigation maneuvers, which may be detected by the dynamometer. The control system may receive the detected movements and determine corresponding movements for the robotic system using inverse kinematics. Then, the control system may instruct movement of the object via the robotic system based on the corresponding movements. Using such test systems and methods, perception systems and responses by safety, navigation, and/or drive systems of AMRs may be tested in a controlled, robust, and repeatable manner.

20 Claims, 9 Drawing Sheets

SYSTEMS AND METHODS TO TEST PERCEPTION AND SAFETY RESPONSES OF AUTONOMOUS MOBILE ROBOTS

BACKGROUND

Many companies may store, package, and ship items and/or groups of items from material handling facilities. For example, many companies may store items in a material handling facility and ship items to various destinations (e.g., customers, stores) from the material handling facility. In addition, various automated or robotic vehicles, machinery, or systems may facilitate various material handling processes and tasks within a facility, often in cooperation with human associates. Accordingly, there is a need for controllable, repeatable, and efficient testing systems and methods to facilitate safe and reliable operations of automated or robotic vehicles within a material handling facility.

DETAILED DESCRIPTION

Figure 1:
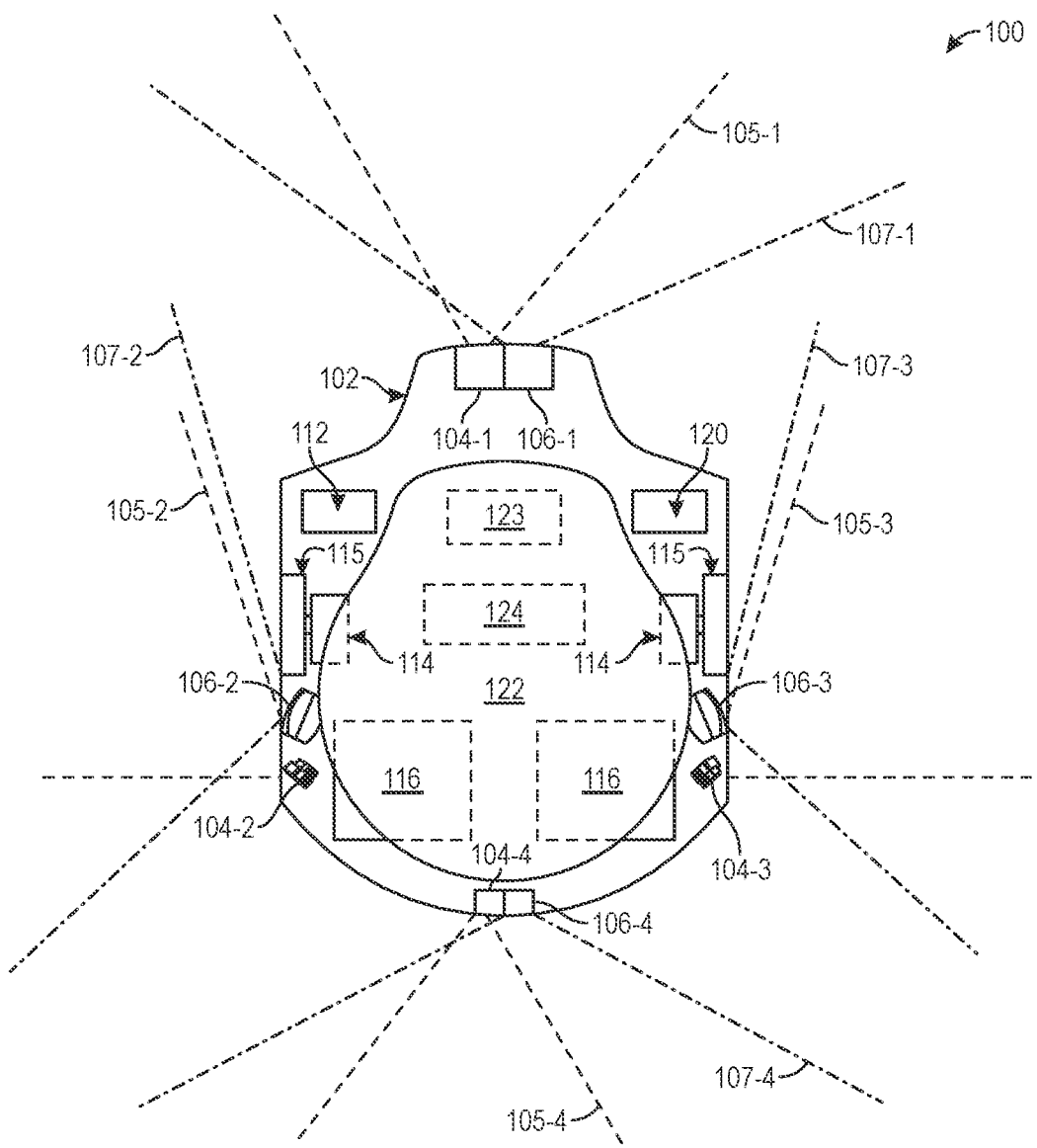
FIG. 1 is a schematic, overhead view diagram of an example autonomous mobile robot having a drive system and a perception system, in accordance with implementations of the present disclosure.

As is set forth in greater detail below, implementations of the present disclosure are directed to systems and methods to test perception systems of autonomous mobile robots. In addition, implementations of the present disclosure are directed to systems and methods to test responses, e.g., safety, navigation, and/or other responses, of autonomous mobile robots based on data from perception systems.

Example embodiments of the testing systems and methods may include an autonomous mobile robot, a dynamometer, a robotic gantry, an enclosure, and a control system. For example, an autonomous mobile robot under test may be positioned on a dynamometer. The autonomous mobile robot may be instructed or commanded to move, navigate, and/or perform various maneuvers, e.g., using its drive and/or navigation systems. The dynamometer may receive, detect, and measure the movements or navigation of the autonomous mobile robot via wheels or rollers in contact with the drive system of the autonomous mobile robot. Thus, the autonomous mobile robot may remain substantially stationary during navigation or performance of various maneuvers while positioned on the dynamometer.

In example embodiments, the control system may receive and process the detected movements or navigation of the autonomous mobile robot, in order to determine corresponding movements of one or more objects in an environment relative to the autonomous mobile robot. For example, the control system may determine or calculate the corresponding movements of one or more objects using inverse kinematics based on the detected movements or navigation of the autonomous mobile robot. Then, the control system may instruct movement of the robotic gantry, and an object carried thereby, based on the calculated corresponding movements. Thus, the robotic gantry may move the carried object relative to the substantially stationary autonomous mobile robot in a manner that simulates or corresponds to actual movement or navigation of the autonomous mobile robot within an environment relative to a substantially stationary object.

Based on navigation of an autonomous mobile robot positioned on a dynamometer and based on corresponding movements of an object carried by a robotic gantry, a perception system of the autonomous mobile robot may be tested under various controlled and repeatable conditions. In addition, different types of perception systems of autonomous mobile robots may be tested under various controlled and repeatable conditions. Moreover, based on detection of an object by a perception system of an autonomous mobile robot, various responses of the autonomous mobile robot may also be tested under various controlled and repeatable conditions. In some examples, the various responses may include stopping, slowing or accelerating, steering or turning, and/or various other navigation or safety responses based on detection of an object by a perception system of an autonomous mobile robot. As described herein, the dynamometer may receive, detect, and measure the various responses of the autonomous mobile robot via wheels or rollers in contact with the drive system of the autonomous mobile robot.

Using the systems and methods described herein, perception systems and safety, navigation, or other responses of autonomous mobile robots may be tested in a reliable, efficient, and cost-effective manner. Because the autonomous mobile robot under test is substantially stationary on a dynamometer, a relatively small and controlled environment may be used for these testing methods. In addition, the testing methods may be repeatably and robustly performed for multiple autonomous mobile robots, for multiple perception systems, with various software or hardware implementations, under various movement or navigation scenarios or conditions, using multiple different objects and associated characteristics, with various environment or lighting characteristics, and/or with respect to various other factors or combinations thereof.

FIG. 1 is a schematic, overhead view diagram 100 of an example autonomous mobile robot (AMR) having a drive system and a perception system, in accordance with implementations of the present disclosure. The example AMRs described in various example embodiments herein may include any and all of the features shown and described at least with respect to the example AMR of FIG. 1.

As shown in FIG. 1, the example AMR 102 may include a perception system comprising a plurality of sensors 104, 106 having respective fields of view 105, 107, a controller or processor 112, a memory 120, drive mechanism controllers 114 and associated drive wheels or rollers 115, power supplies 116, a lift mechanism controller 122, a safety system controller 123, and a navigation system controller 124.

The perception system may comprise one or more imaging sensors, stereo imaging devices, light detection and ranging (LIDAR) sensors, radar sensors, proximity sensors, other types of time-of-flight sensors, RFID readers or sensors, or other types of sensors. For example, the perception system may comprise a plurality of stereo imaging devices 104 and a plurality of LIDAR sensors 106. As shown in FIG. 1, a first stereo imaging device 104-1 may have a first field of view 105-1 directed toward a forward movement direction of the AMR 102, a second stereo imaging device 104-2 may have a second field of view 105-2 directed toward a left side of the AMR 102, a third stereo imaging device 104-3 may have a third field of view 105-3 directed toward a right side of the AMR 102, and a fourth stereo imaging device 104-4 may have a fourth field of view 105-4 directed toward a rearward movement direction of the AMR 102.

Similarly, as shown in FIG. 1, a first LIDAR sensor 106-1 may have a first field of view 107-1 directed toward a forward movement direction of the AMR 102, a second LIDAR sensor 106-2 may have a second field of view 107-2 directed toward a left side of the AMR 102, a third LIDAR sensor 106-3 may have a third field of view 107-3 directed toward a right side of the AMR 102, and a fourth LIDAR sensor 106-4 may have a fourth field of view 107-4 directed toward a rearward movement direction of the AMR 102.

The perception system may detect or capture sensor data of one or more objects in proximity to the AMR 102, e.g., around at least a portion of a periphery of the AMR 102 based on the fields of view 105, 107 of the plurality of sensors 104, 106. For example, the plurality of sensors 104, 106 may detect objects substantially 360 degrees around a periphery of the AMR 102. In other examples, an AMR 102 may have fewer sensors than the plurality of sensors 104, 106 shown in FIG. 1, such that objects may be detected around only a portion of a periphery of the AMR 102, e.g., toward a forward movement direction and at least partially along right and/or left sides of the AMR 102. In further examples, an AMR 102 may include more or other numbers of sensors in various configurations and arrangements than the plurality of sensors 104, 106 shown in FIG. 1, such that objects may be detected proximate substantially any and all portions of the periphery of the AMR 102. Further, the fields of view 105, 107 of the plurality of sensors 104, 106 may include a vertical range to detect objects with greater height, overhanging objects, overhead machines, equipment, or obstacles, airborne or flying objects, or various other types of objects.

The perception system of the AMR 102 may include various types, configurations, arrangements, or combinations of the plurality of sensors 104, 106 having various attributes or characteristics. For example, various types of imaging sensors, imaging devices, or proximity sensors may detect presence, type, number, size, shape, or other attributes of one or more objects proximate the AMR 102. In addition, various types of stereo imaging devices, depth sensors, LIDAR sensors, radar sensors, or other time of flight sensors may detect distances to one or more objects proximate the AMR 102. The various imaging sensors or stereo imaging devices may have different characteristics, such as field of view, focal length, resolution, image capture rate, exposure time, or others. Further, the various LIDAR, radar, or other time of flight sensors may have different characteristics, such as types, strength, ranges, or other characteristics of emitted and received electromagnetic radiation.

The controller or processor 112 may receive, process, analyze, and/or transmit data, information, instructions, and/or commands associated with operations of the AMR 102. The memory 120 may store data, information, instructions, and/or commands associated with operations of the AMR 102. In addition, the drive mechanism controllers 114 may receive, process, and/or analyze instructions or commands associated with drive operations of the AMR 102, and may transmit instructions or commands to actuators, motors, wheels 115, or various other types of propulsion mechanisms that may cause movement of the AMR 102.

For the example AMR 102 illustrated in FIG. 1, forward movement may be achieved by instructing rotation of both drive wheels in a same forward direction at a substantially same rotational speed, and conversely, reverse movement may be achieved by instructing rotation of both drive wheels in a same rearward direction at a substantially same rotational speed. In addition, forward movement in an arc may be achieved by instructing rotation of both drive wheels in a same forward direction but at different rotational speeds, and conversely, reverse movement in an arc may be achieved by instructing rotation of both drive wheels in a same rearward direction but at different rotational speeds. Further, turns or rotations of the AMR 102 may be achieved by instructing rotation of only one drive wheel in a forward or rearward direction, or by instructing rotation of both drive wheels in opposite directions and at the same or different rotational speeds.

Further, the power supplies 116 may comprise batteries or other types of power storage devices, and may provide power to various components of the AMR 102. Moreover, the controller 112, memory 120, drive mechanism controllers 114, and power supplies 116 may be in communication with each other, as well as with other components of the AMR 102 described herein, in order to control and coordinate operations of the AMR 102.

In some example embodiments, the AMR 102 may include a lift mechanism controller 122 and corresponding lifting plate, surface, or elements that are configured to couple to and/or lift an object, such as a container, shelves, inventory storage pod, or other types of objects. For example, the AMR 102 may move under an object, e.g., under an inventory storage pod, and the lift mechanism controller 122 may instruct the lifting plate to couple to and lift the object. In other example embodiments, the lift mechanism controller 122 may couple the lifting plate or one or more elements, such as hooks, arms, clamps, beams, posts, or other connecting elements, to the object and then push or pull the object, e.g., using wheels or rollers associated with the object. In still further example embodiments, the AMR 102 may include other modular attachments or components on top of or in place of the lifting plate to load, transport, and unload objects, such as trays, bins, containers, receptacles, conveyor sections, robotic arms, or other components. In yet further example embodiments, the AMR 102 may not include a lift mechanism controller 122 and may instead be configured to load, transport, and unload objects to and from an upper surface, tray, bin, container, receptacle, or other portion of the AMR 102.

The safety system controller 123, which may form or be a part of the controller 112, may be in communication with the controller 112, memory 120, drive mechanism controllers 114, power supplies 116, and navigation system controller 124, as well as other components described herein, in order to maintain safety of the AMR 102 within an environment. For example, the safety system controller 123 may receive data from the plurality of sensors 104, 106 related to one or more detected objects proximate an AMR 102. In addition, the safety system controller 123 may receive data from other components of the AMR 102 and/or a control system within the environment, e.g., related to type, capabilities, position, speed, acceleration, weight, load, other characteristics of the AMR, and/or various characteristics of the environment.

Based on the received data, the safety system controller 123 may process the data associated with one or more detected objects, and then determine, instruct, or command one or more responses to the detected objects. For example, the one or more responses may comprise safety responses, navigation instructions or commands, or other actions. Example responses may comprise stopping movement of the AMR 102, slowing or accelerating movement of the AMR 102, steering, turning, or rotating the AMR 102, and/or combinations thereof. In addition, other example responses may comprise various changes, adjustments, or modifications to one or more other portions of the AMR 102, such as raising or lowering a lift mechanism, actuating or moving a portion of a modular attachment such as a conveyor section or robotic arm, and/or changes to other portions of the AMR 102.

The navigation system controller 124, which may also form or be a part of the controller 112, may be in communication with the controller 112, memory 120, drive mechanism controllers 114, power supplies 116, and safety system controller 123, as well as other components described herein, in order to control movement of the AMR 102 within an environment. For example, the navigation system controller 124 may receive data or information from the controller 112, memory 120, the drive mechanism controllers 114, or other sensors or components related to type, capabilities, position, speed, acceleration, weight, load, other characteristics of the AMR, and/or various characteristics of the environment. In addition, the navigation system controller 124 may include or be in communication with one or more position or location determination sensors or systems, such as global positioning system (GPS) sensors, indoor positioning system sensors, or other types of location determination sensors. Generally, the navigation system controller 124 may instruct or command movement or transport operations of the AMR 102 to perform various tasks, such as forward movement, forward movement in an arc, reverse movement, reverse movement in an arc, turns or rotations, other movements or navigational maneuvers, and/or combinations thereof.

In addition, the navigation system controller 124 may receive data or information from the safety system controller 123 related to one or more objects detected by the perception system of the AMR 102, and/or one or more responses to the detected objects. Based on the received data, the navigation system controller 124 may instruct or command modifications to one or more movement characteristics of the AMR 102, e.g., to prevent contact or impact with detected objects and/or to maintain a minimum or desired separation distance from the objects. As described herein, the one or more responses may comprise safety responses, navigation instructions or commands, or other actions. Example responses may comprise stopping movement of the AMR 102, slowing or accelerating movement of the AMR 102, steering, turning, or rotating the AMR 102, and/or combinations thereof. In addition, other example responses may comprise various changes, adjustments, or modifications to one or more other portions of the AMR 102, such as raising or lowering a lift mechanism, actuating or moving a portion of a modular attachment such as a conveyor section or robotic arm, and/or changes to other portions of the AMR 102.

Figure 8:
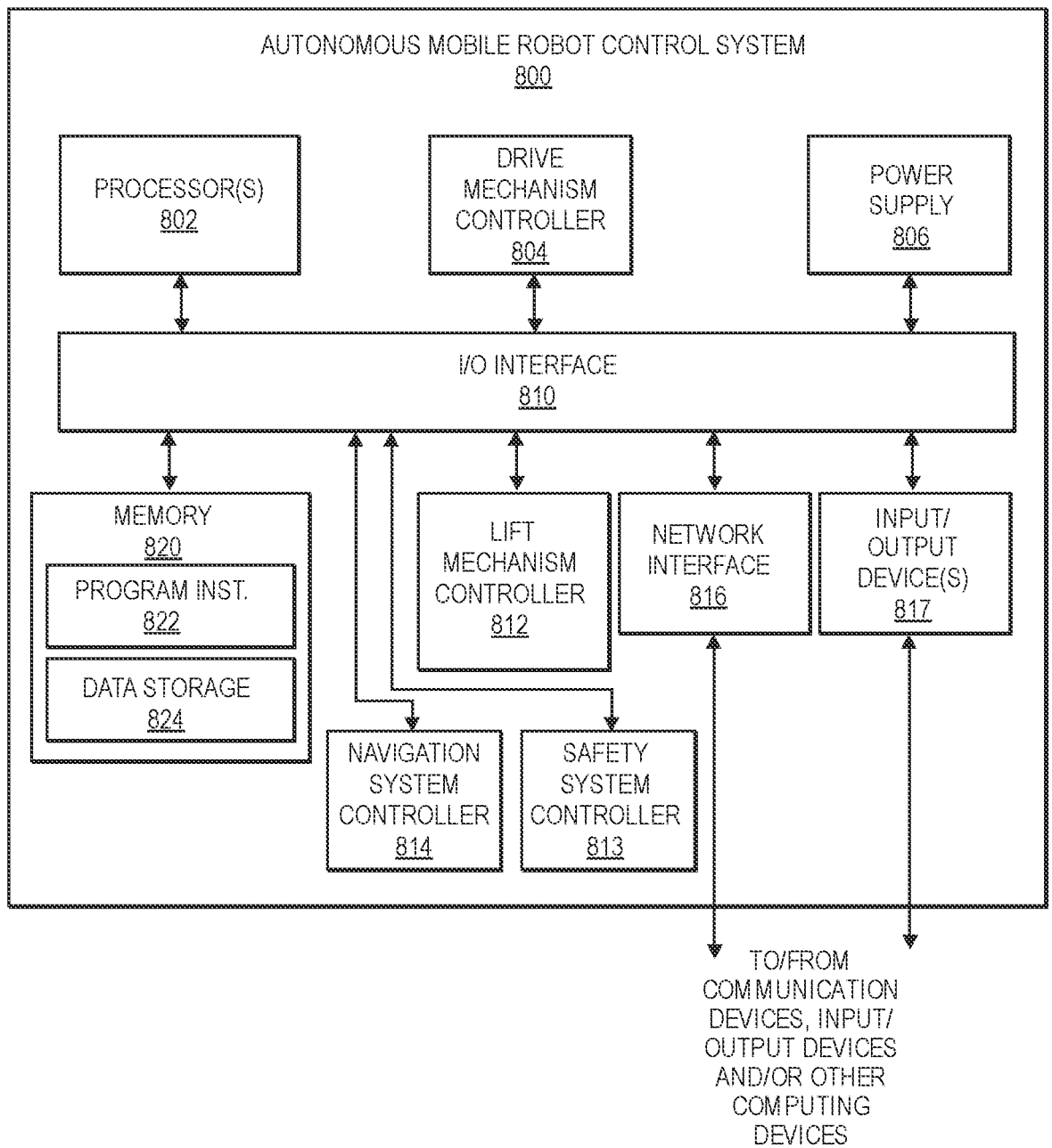
FIG. 8 is a block diagram illustrating various components of an example autonomous mobile robot control system, in accordance with implementations of the present disclosure.

Further details of various components of the AMR 102, including the controller or processor 112, memory 120, drive mechanism controllers 114, power supplies 116, lift mechanism controller 122, safety system controller 123, and navigation system controller 124 are described herein at least with respect to FIG. 8.

Although FIG. 1 illustrates a particular number, type, configuration, or arrangement of components of an autonomous mobile robot, other example embodiments may include various other numbers, types, configurations, or arrangements of components. For example, other types of sensors may be included in the perception system, one or more sensors may be positioned in different positions and with different orientations, drive systems may comprise other types, configurations, or arrangements of actuators, wheels, rollers, tracks, and/or other components, various safety and/or navigation operations or functions may be consolidated, combined, or distributed in one or more controllers or processors, and/or various components may be modified, combined, or omitted in other example embodiments of autonomous mobile robots.

Figure 2:
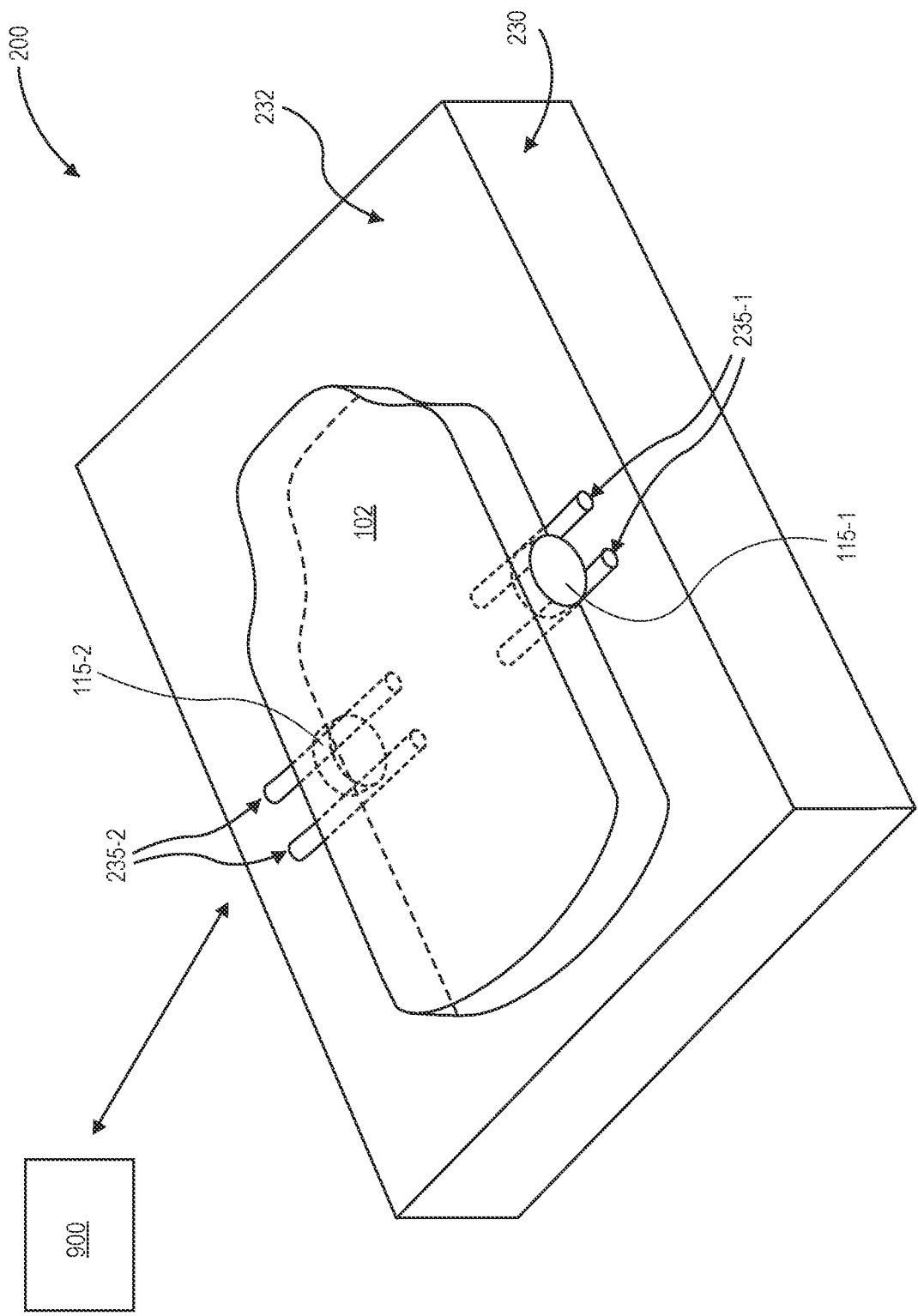
FIG. 2 is a schematic, perspective view diagram of a portion of an example testing system including an example autonomous mobile robot positioned on a dynamometer, in accordance with implementations of the present disclosure.

FIG. 2 is a schematic, perspective view diagram 200 of a portion of an example testing system including an example autonomous mobile robot positioned on a dynamometer, in accordance with implementations of the present disclosure.

As shown in FIG. 2, the example testing system may include a dynamometer 230 that may comprise an upper surface 232 and one or more rollers, wheels, or other components 235 configured to contact, engage, and/or cooperate with one or more rollers, wheels, or other drive components of a drive system of an AMR 102 that is positioned on the dynamometer 230. Generally, a dynamometer 230 may comprise one or more actuators, motors, loads, controllers or processors, memories, sensors, encoders, and/or other components associated with movement or rotation of the one or more rollers, wheels, or other components 235. As illustrated in the example of FIG. 2, first rollers, wheels, or other components 235-1 may be configured to contact, engage, and/or cooperate with a first drive wheel 115-1 of a drive system of an AMR 102, and second rollers, wheels, or other components 235-2 may be configured to contact, engage, and/or cooperate with a second drive wheel 115-2 of a drive system of an AMR 102.

In some example embodiments, the one or more rollers, wheels, or other components 235 may detect or sense movement or rotation of respective rollers, wheels, or other drive components of a drive system of an AMR 102, e.g., using imaging sensors, rotation sensors, rotary encoders, or various other types of sensors. The detected or sensed movements or rotations may include aspects of AMR movement such as direction, speed, acceleration, deceleration, steering or turning, rotation, braking or stopping, or other aspects. In additional example embodiments, the one or more rollers, wheels, or other components 235 may apply or generate torques, loads, or other forces to the one or more rollers, wheels, or other drive components of a drive system of an AMR 102, e.g., using actuators, motors, loads, resistance or friction-generating components, damping components, or various other types of components. Further, the detection of movement or rotation of portions of a drive system, and/or the application of torques, loads, or forces to portions of a drive system may be performed substantially independently for each drive wheel of an AMR 102.

In example embodiments, the application or generation of torques, loads, or other forces to the one or more rollers, wheels, or other drive components of a drive system of an AMR 102 may approximately simulate or replicate various attributes or characteristics associated with the AMR 102 and/or an environment in which the AMR 102 is operating. For example, the applied torques, loads, or forces may simulate a weight of the AMR 102, a payload carried by the AMR 102, a drive torque of the drive system of the AMR 102, acceleration or deceleration of the AMR 102, a grade or slope associated with a surface on which the AMR 102 is navigating, other surface features, materials, friction properties, or irregularities associated with a surface on which the AMR 102 is navigating, and/or various external forces or loads that may be applied to the AMR 102 during navigation.

In further example embodiments, a drive system of an AMR 102 may also include one or more sensors, such as imaging sensors, rotation sensors, rotary encoders, or various other types of sensors, to detect or sense movement or rotation of one or more rollers, wheels, or other drive components 115 of a drive system of an AMR 102. By comparing detected movement or rotation of drive components 115 of an AMR 102 with detected movement or rotation of rollers, wheels, or other components 235 of a dynamometer 230, an approximate amount of slip may be determined between the drive components 115 of the AMR 102 and the rollers or wheels 235 of the dynamometer 230. In addition, the determined amount of slip may depend on attributes associated with the AMR 102, such as weight, payload, drive torque, acceleration, or others, and/or attributes associated with an environment in which the AMR 102 is operating, such as grades, slopes, surface features, materials, friction properties, or irregularities associated with a surface on which the AMR 102 is navigating. As further described herein, when testing safety or navigation operations or functions of an AMR 102 using the testing systems and methods described herein, the approximate amount of slip may also be detected, processed, and used to determine whether the AMR 102 responds safely and correctly in various test situations or scenarios.

In addition, the example dynamometer 230 may be in communication, via wired or wireless connections, with a control system 900. For example, data, instructions, and/or commands may be transferred or transmitted between controllers, processors, memories, or other components associated with each of the dynamometer 230 and the control system 900. Various portions or components of the dynamometer 230 and/or the control system 900 may perform various functions or operations associated with detecting or sensing movement or rotation of a drive system of an AMR 102, as well as applying or generating torques, loads, or other forces to a drive system of an AMR 102. Further details of the control system 900 are described herein at least with respect to FIG. 9.

When an AMR 102 to be tested, i.e., AMR under test, is positioned on a dynamometer 230, the AMR 102 may be substantially stationary relative to the upper surface 232 of the dynamometer 230. While positioned on the dynamometer 230, the AMR 102 may be instructed, commanded, programmed, or scripted to perform various navigation maneuvers using its drive system and rollers, wheels, or other drive components 115, such as moving forward, moving forward in an arc, moving rearward, moving rearward in an arc, turning or rotation, and/or combinations thereof. During such navigation maneuvers, the AMR 102 may remain substantially stationary relative to the upper surface 232 of the dynamometer 230. In addition, the drive components 115 of the AMR 102 may contact, engage, or cooperate with the rollers or wheels 235 of the dynamometer 230, such that movements, arcs, turns, and/or rotations of the AMR 102 may be determined based on corresponding movement or rotation of the rollers or wheels 235 of the dynamometer 230. In this manner, although the AMR 102 may remain substantially stationary upon the dynamometer 230, the AMR 102 may nonetheless perform various navigation maneuvers that may be sensed and determined by the dynamometer 230 and/or the control system 900.

Although FIG. 2 illustrates a particular number, type, configuration, or arrangement of components of a dynamometer configured to receive an autonomous mobile robot, other example embodiments may include various other numbers, types, configurations, or arrangements of components. For example, various types, numbers, or arrangements of rollers, wheels, or other components may be present, various types of sensors may be included to detect or sense movement or rotation of rollers, wheels, or other components, various types of actuators, motors, loads, or other components may apply or generate torques, loads, or forces to portions of a drive system of an AMR, and/or various components may be modified, combined, or omitted in other example embodiments of a dynamometer configured to receive an autonomous mobile robot.

Figure 3:
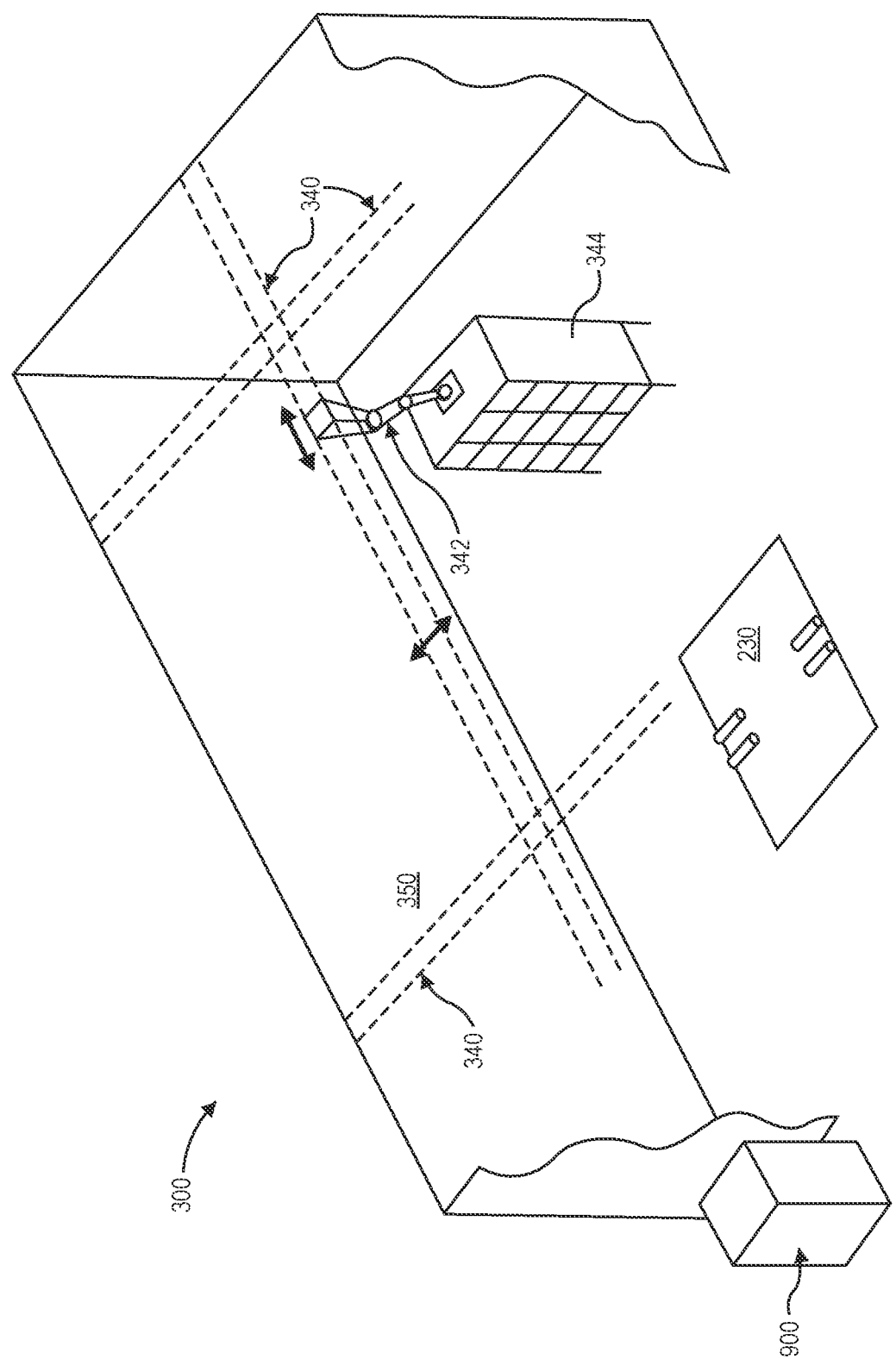
FIG. 3 is a schematic, perspective view diagram of an example testing system including a dynamometer, robotic gantry, and enclosure, in accordance with implementations of the present disclosure.

FIG. 3 is a schematic, perspective view diagram 300 of an example testing system including a dynamometer, robotic gantry, and enclosure, in accordance with implementations of the present disclosure.

As shown in FIG. 3, the example testing system may include a dynamometer 230, a robotic system or gantry 340, 342 carrying an object 344, and an enclosure 350. The dynamometer 230 may include any and all of the features described herein at least with respect to FIG. 2. In addition, the dynamometer 230 may be positioned within a boundary defined by the enclosure 350, e.g., approximately centrally positioned within an environment, and the dynamometer 230 may be configured to receive an AMR under test (not shown).

In example embodiments, the robotic system may comprise a robotic gantry 340 in combination with a robotic arm 342. For example, the robotic arm 342 may comprise a six-axis robotic arm, or other types of robotic arms. In addition, the robotic arm 342 may include one or more end effectors, such as grasping arms or fingers, suction or vacuum end effectors, gripping jaws or clamps, hooks, straps, or other attachment features, or other types of end effectors. Using one or more end effectors, the robotic arm 342 may grasp and manipulate an object 344, e.g., in one-, two-, or three-dimensional space.

Example objects 344 may comprise inventory storage pods, shelves, containers, totes, bins, boxes, crates, pallets, ground vehicles, forklifts, other AMRs, aerial vehicles, machinery or equipment, objects that simulate humans or associates, items or groups of items, and/or various other types of objects associated with various types of environments. In addition, the example objects 344 may have various different surface or visual characteristics, such as different materials, surface features or textures, colors, paints, reflectivity, or other visual attributes. Further, the example objects 344 may also simulate or replicate moving or mobile objects, such as vehicles, humans, machinery, or other objects, and such moving or mobile objects may have various different movement attributes, such as direction, speed, acceleration, or other attributes.

In addition, the robotic gantry 340 may comprise one or more overhead tracks or rails along which a gantry system may move, e.g., in one-, two-, or three-dimensional space. In the example illustrated in FIG. 3, at least two sets of orthogonal tracks or rails (shown in dashed lines) may facilitate movement of the gantry system in two-dimensional space, e.g., in a two-dimensional plane substantially parallel with a ground of the environment. In addition, the robotic gantry 340 may be coupled, permanently or releasably, to the robotic arm 342, and facilitate movement of the robotic arm 342 along at least one of the tracks or rails. The robotic arm 342 and/or a portion of the gantry system may further enable movement in a third dimension, e.g., substantially orthogonal to a ground of the environment, such that the robotic gantry 340 in combination with the robotic arm 342 may move an object 344 in substantially three-dimensional space within the environment.

In some example embodiments, portions of the robotic gantry 340 and the robotic arm 342 may be covered or shrouded to be less visible, observable, or detectable by a perception system of an AMR 102. For example, various types of materials, shrouds, surface treatments or textures, colors, paints, or other coatings or covers may be applied to portions of the robotic gantry 340 and robotic arm 342, such that substantially only the object 344 carried and moved by the robotic gantry 340 and robotic arm 342 may be visible, observable, or detectable by a perception system of an AMR 102.

The enclosure 350 may comprise one or more walls, panels, curtains, dividers, barricades, shades, shrouds, or other elements to substantially enclose or encompass the example testing system described herein. For example, the enclosure 350 may substantially surround or encompass the dynamometer 230 upon which an AMR under test may be positioned, as well as the robotic gantry 340 and robotic arm 342 configured to grasp and move an object 344. In some example embodiments, portions of the enclosure 350 may include various types of materials, surface treatments or textures, colors, paints, or other attributes so as to be less visible, observable, or detectable by a perception system of an AMR 102. For example, portions of the enclosure 350 may be colored or painted flat black, and/or may include materials or surface treatments or textures that at least partially absorb light, LIDAR, radar, or other electromagnetic radiation.

In additional example embodiments, portions of the enclosure 350 may include various images, photographs, or other representations of example environments in which an AMR may operate, in order to simulate aspects of the example environments that may be detected by a perception system of an AMR. In further example embodiments, various images, photographs, or other representations of example environments in which an AMR may operate may be projected or displayed upon portions of the enclosure 350, e.g., by one or more projectors, displays, monitors, screens, or other display devices, in order to simulate aspects of the example environments that may be detected by a perception system of an AMR. Moreover, the projections or displays of the example environments upon portions of the enclosure 350 may move or change responsive to movement or navigation of the AMR as detected by the dynamometer 230, e.g., together with movement of the object 344 that is carried and manipulated by the robotic gantry 340 and robotic arm 342 as further described herein.

In further example embodiments, various aspects of the environment may be modified or changed for various test scenarios or situations. For example, lighting within the enclosure 350 may be modified or changed to test detection of an object by a perception system of an AMR under different lighting conditions. The various lighting conditions may include modifications to frequency or wavelength of light, intensity of light, positions or orientations of light sources, numbers of light sources, movements, oscillations, or changes in lighting, various other modifications or changes, and/or combinations thereof. Such modifications or changes may test detection of an object by a perception system of an AMR under different lighting conditions, and may also test responses, such as safety or navigation maneuvers, by an AMR under different lighting conditions associated with various test scenarios or situations.

In addition to different lighting conditions, humidity, air quality, and/or other aspects of the environment may also be modified or changed for various test scenarios or situations. For example, a temperature may be changed, a level of humidity may be modified, fog, dust, or other particulates may be introduced or removed, and/or various other modifications or changes may be made to the environment within the enclosure. Such modifications or changes may test detection of an object by a perception system of an AMR under different environment conditions, and may also test responses, such as safety or navigation maneuvers, by an AMR under different environment conditions associated with various test scenarios or situations.

As described herein, when an AMR to be tested, i.e., AMR under test, is positioned on a dynamometer 230, the AMR may be substantially stationary relative to the upper surface of the dynamometer 230 and within the enclosure 350. While positioned on the dynamometer 230, the AMR may be instructed, commanded, programmed, or scripted to perform various navigation maneuvers using its drive system and rollers, wheels, or other drive components, such as moving forward, moving forward in an arc, moving rearward, moving rearward in an arc, turning or rotation, and/or combinations thereof. During such navigation maneuvers, the AMR may remain substantially stationary relative to the upper surface of the dynamometer 230 and the enclosure 350. In addition, the drive components of the AMR may contact, engage, or cooperate with the rollers or wheels of the dynamometer 230, such that movements, arcs, turns, and/or rotations of the AMR may be determined based on corresponding movement or rotation of the rollers or wheels of the dynamometer 230. In this manner, although the AMR may remain substantially stationary upon the dynamometer 230 and within the enclosure 350, the AMR may nonetheless perform various navigation maneuvers that may be sensed and determined by the dynamometer 230 and/or the control system 900.

Based on the detected or sensed movements or navigation of the AMR positioned upon the dynamometer 230, corresponding movements of the object 344 may be determined using inverse kinematics. As a simple example, because the AMR is stationary upon the dynamometer 230, if the AMR is instructed to move forward five meters toward an object 344, then using inverse kinematics, the object 344 should be instructed to move toward the AMR by five meters in order to simulate forward movement of the AMR by five meters relative to the object 344. In another simple example, again because the AMR is stationary upon the dynamometer 230, if the AMR is instructed to rotate in place by ninety degrees to the right of an object 344, then using inverse kinematics, the object 344 should be instructed to move along an arc ninety degrees toward a left of the AMR in order to simulate rotation of the AMR by ninety degrees to the right relative to the object 344. In this manner, various navigation maneuvers of an AMR positioned upon the dynamometer 230 may be processed, calculated, or determined using inverse kinematics to generate or determine corresponding movements or rotations of the object 344 by the robotic gantry 340 and robotic arm 342 to simulate the various navigation maneuvers of the AMR and combinations thereof.

As a result, based on the determined or calculated corresponding movements of the object 344 using inverse kinematics, the control system 900 may instruct the robotic gantry 340 and robotic arm 342 to move or manipulate the object 344 according to the determined corresponding movements. During the movement or manipulation of the object 344 by the robotic gantry 340 and robotic arm 342, a perception system of the AMR may detect, attempt to detect, or fail to detect the object 344, and it may be determined whether the perception system safely, efficiently, and reliably detected the object 344, e.g., detected and/or identified the object 344. Thus, the testing systems and methods described herein may enable and facilitate testing of a perception system of an AMR during various movements and navigation of the AMR in a controlled, robust, and repeatable fashion using a dynamometer, a robotic system that moves an object, and a control system.

Further, during the movement or manipulation of the object 344 by the robotic gantry 340 and robotic arm 342, a safety, navigation, and/or drive system of the AMR may respond, attempt to respond, or fail to respond to detection of the object 344, and it may be determined whether the safety, navigation, and/or drive system safely, efficiently, and reliably responded to the detected object 344, e.g., to avoid impact or contact with the object 344, or to maintain a minimum separation distance from the object 344. Thus, the testing systems and methods described herein may enable and facilitate testing of a safety, navigation, and/or drive system of an AMR during various movements and navigation of the AMR in a controlled, robust, and repeatable fashion using a dynamometer, a robotic system that moves an object, and a control system.

In addition, the example dynamometer 230, robotic gantry 340, robotic arm 342, and/or adjustable or changeable portions of the enclosure 350 may be in communication, via wired or wireless connections, with a control system 900. For example, data, instructions, and/or commands may be transferred or transmitted between controllers, processors, memories, or other components associated with each of the components of the example testing system and the control system 900. Various portions or components of the example testing system and/or the control system 900 may perform various functions or operations associated with detecting or sensing movement or navigation of an AMR, applying or generating torques, loads, or other forces to an AMR, determining corresponding movements of an object based on detected movements of the AMR, instructing corresponding movements of the object by a robotic system relative to the dynamometer and AMR, adjusting or modifying aspects of the object, enclosure, and/or environment, and/or various other functions or operations. Further details of the control system 900 are described herein at least with respect to FIG. 9.

Although FIG. 3 illustrates a particular number, type, configuration, or arrangement of components of an example testing system for an autonomous mobile robot, other example embodiments may include various other numbers, types, configurations, or arrangements of components. For example, various types, numbers, or arrangements of dynamometers may be present, various types of robotic systems may be used to move one or more objects within the environment, one or more types or combinations of objects may be present, various sizes or shapes of enclosures may be used, and/or various components may be modified, combined, or omitted in other example embodiments of an example testing system for an autonomous mobile robot.

Figure 4:
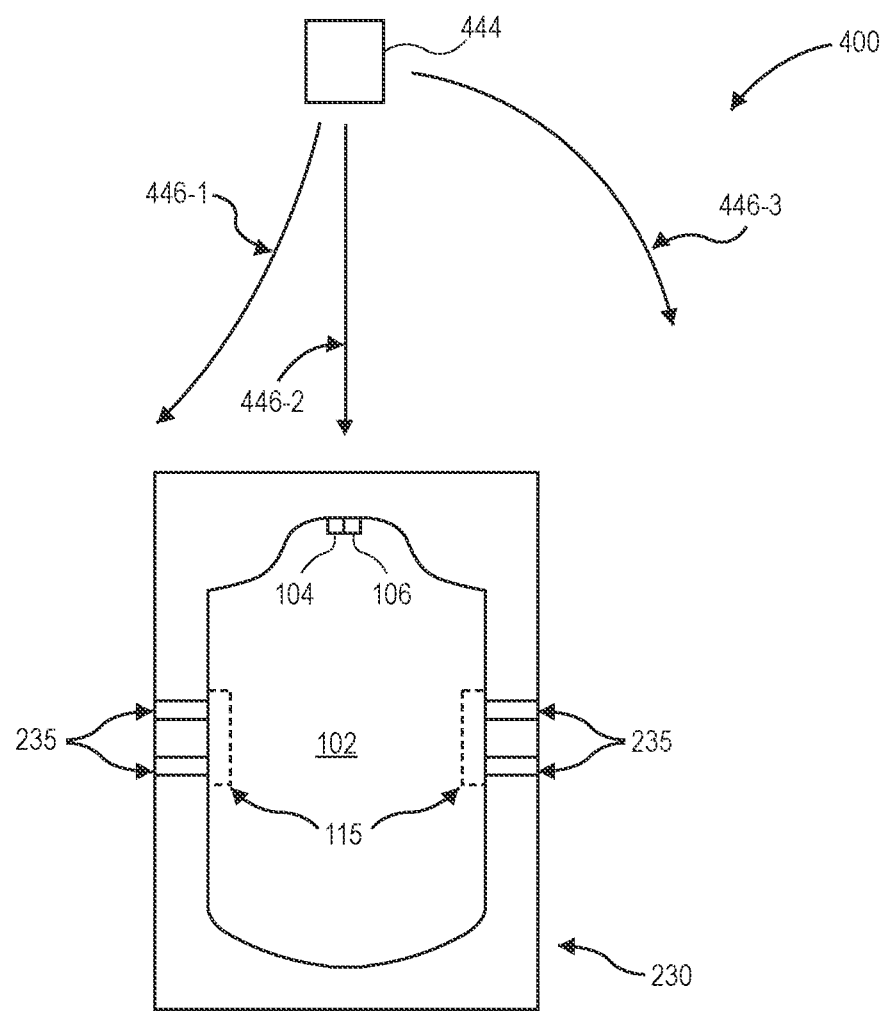
FIG. 4 is a schematic, overhead view diagram of a portion of an example testing system including an example autonomous mobile robot positioned on a dynamometer and relative to an object carried by a robotic gantry, in accordance with implementations of the present disclosure.

FIG. 4 is a schematic, overhead view diagram 400 of a portion of an example testing system including an example autonomous mobile robot positioned on a dynamometer and relative to an object carried by a robotic gantry, in accordance with implementations of the present disclosure.

As shown in FIG. 4, an AMR 102 under test may be positioned upon a dynamometer 230. The AMR 102 may include any and all of the features described herein at least with respect to FIGS. 1-3, and the dynamometer 230 may include any and all of the features described herein at least with respect to FIGS. 2 and 3. Other portions of the example testing system described herein at least with respect to FIG. 3 may also be present, although not shown, in the example testing system of FIG. 4.

The AMR 102 may be positioned on the upper surface of the dynamometer 230 such that the drive wheels 115 of the AMR 102 contact, engage, or cooperate with respective rollers or wheels 235 of the dynamometer 230. As described herein, rotation of a drive wheel 115 of the AMR 102 may be detected or sensed based on corresponding rotation of a respective roller or wheel 235 of the dynamometer, in order to determine movements or navigation of the AMR 102.

In addition, FIG. 4 illustrates an object 444 that may be moved by a robotic system, such as a robotic gantry and/or robotic arm described herein. The object 444 may comprise any of various types of objects, and the object 444 may have various visual attributes that may be changed or modified according to different test scenarios or situations. In addition, attributes associated with an environment, such as lighting, temperature, humidity, air quality, or other attributes, may be modified according to different test scenarios or situations.

While positioned on the dynamometer 230, the AMR 102 under test may be instructed to perform one or more navigation maneuvers, such as moving forward in a substantially straight line, moving forward along an arc to the left or to the right, turning or rotating substantially in place, moving rearward in a substantially straight line, moving rearward along an arc to the left or to the right, and/or combinations thereof. In addition, various movement characteristics, such as speed, acceleration, deceleration, starts, stops, turning radius, or other characteristics, may be modified during the one or more navigation maneuvers. Various combinations of navigation maneuvers may be generated, programmed, or scripted for the AMR 102 under test in order to test a perception system of the AMR, as well as to test safety and/or navigation responses of the AMR upon detection of one or more objects by the perception system, e.g., sensors 104, 106 of the perception system.

In a first example with respect to FIG. 4, the AMR 102 may be instructed to move forward along an arc to the right of object 444. For example, a left drive wheel 115 may be instructed to rotate in a forward direction at a first rotational speed, and a right drive wheel 115 may be instructed to rotate in a forward direction at a second rotational speed that is lower than the first rotational speed. In this manner, the AMR 102 may perform a navigation maneuver to move forward in an arc to the right.

Based on detection of rotation of the rollers 235 in cooperation with respective wheels 115 of the AMR 102, a control system may process the detected or sensed movements of the drive wheels 115 of the AMR 102, and determine corresponding movements of the object 444 using inverse kinematics. In this example, the corresponding movements of the object 444 may comprise an arc 446-1 that approaches and moves toward a left side of the AMR 102. Based on the generated or determined corresponding movements, a robotic system may be instructed to move the object 444 along the arc 446-1 relative to the stationary AMR 102 upon the dynamometer 230. Thus, the object 444 may move relative to the stationary AMR 102 in the same manner that the AMR 102 would normally move relative to a stationary object 444, if the AMR 102 were not maintained stationary upon the dynamometer 230 of the example testing system.

During movement of the object 444 by the robotic system, a perception system, e.g., one or more sensors 104, 106, of the AMR 102 may detect, or attempt to detect, the object 444. The control system may receive and process the sensor data received from the sensors 104, 106 of the AMR 102 and determine whether the perception system correctly detected the object 444. Because the AMR 102 is stationary upon the dynamometer 230, and because the control system, via the robotic system, positively controls the position of the object 444 relative to the AMR 102, the sensor data from the sensors 104, 106 of the AMR 102 can be processed and compared to a known or expected location of the object 444, in order to determine whether the perception system correctly detected the object 444.

Further, during movement of the object 444 by the robotic system, a safety, navigation, and/or drive system of the AMR 102 may determine one or more responses to detection of the object 444. For example, the responses may comprise changes or modifications to direction, speed, acceleration, deceleration, turning radius, or other aspects of movement of the AMR 102 via the drive wheels 115. Based on detection of rotation of the rollers 235 in cooperation with respective wheels 115 of the AMR 102, a control system may process the detected or sensed changes or modifications to movements of the drive wheels 115 of the AMR 102, and determine whether the AMR 102 responded correctly to the detected object 444. Again, because the AMR 102 is stationary upon the dynamometer 230, and because the control system, via the robotic system, positively controls the position of the object 444 relative to the AMR 102, the detected or sensed changes or modifications to movements of the drive wheels 115 of the AMR 102 can be processed and compared to a desired or expected response of the AMR 102, in order to determine whether the safety, navigation, and/or drive system responded correctly to the detected object 444. As described herein, the various responses may comprise stopping, accelerating, decelerating, steering or turning, other changes to movement, or combinations thereof.

In a second example with respect to FIG. 4, the AMR 102 may be instructed to move forward along a substantially straight line toward object 444. For example, a left drive wheel 115 may be instructed to rotate in a forward direction at a first rotational speed, and a right drive wheel 115 may be instructed to rotate in a forward direction at the same first rotational speed. In this manner, the AMR 102 may perform a navigation maneuver to move forward in a substantially straight line.

Based on detection of rotation of the rollers 235 in cooperation with respective wheels 115 of the AMR 102, a control system may process the detected or sensed movements of the drive wheels 115 of the AMR 102, and determine corresponding movements of the object 444 using inverse kinematics. In this example, the corresponding movements of the object 444 may comprise a substantially straight line 446-2 that approaches a forward side of the AMR 102. Based on the generated or determined corresponding movements, a robotic system may be instructed to move the object 444 along the substantially straight line 446-2 relative to the stationary AMR 102 upon the dynamometer 230. Thus, the object 444 may move relative to the stationary AMR 102 in the same manner that the AMR 102 would normally move relative to a stationary object 444, if the AMR 102 were not maintained stationary upon the dynamometer 230 of the example testing system.

During movement of the object 444 by the robotic system, a perception system, e.g., one or more sensors 104, 106, of the AMR 102 may detect, or attempt to detect, the object 444. The control system may receive and process the sensor data received from the sensors 104, 106 of the AMR 102 and determine whether the perception system correctly detected the object 444. Because the AMR 102 is stationary upon the dynamometer 230, and because the control system, via the robotic system, positively controls the position of the object 444 relative to the AMR 102, the sensor data from the sensors 104, 106 of the AMR 102 can be processed and compared to a known or expected location of the object 444, in order to determine whether the perception system correctly detected the object 444.

Further, during movement of the object 444 by the robotic system, a safety, navigation, and/or drive system of the AMR 102 may determine one or more responses to detection of the object 444. For example, the responses may comprise changes or modifications to direction, speed, acceleration, deceleration, turning radius, or other aspects of movement of the AMR 102 via the drive wheels 115. Based on detection of rotation of the rollers 235 in cooperation with respective wheels 115 of the AMR 102, a control system may process the detected or sensed changes or modifications to movements of the drive wheels 115 of the AMR 102, and determine whether the AMR 102 responded correctly to the detected object 444. Again, because the AMR 102 is stationary upon the dynamometer 230, and because the control system, via the robotic system, positively controls the position of the object 444 relative to the AMR 102, the detected or sensed changes or modifications to movements of the drive wheels 115 of the AMR 102 can be processed and compared to a desired or expected response of the AMR 102, in order to determine whether the safety, navigation, and/or drive system responded correctly to the detected object 444. As described herein, the various responses may comprise stopping, accelerating, decelerating, steering or turning, other changes to movement, or combinations thereof.

In a third example with respect to FIG. 4, the AMR 102 may be instructed to turn or rotate substantially in place toward the left of object 444. For example, a left drive wheel 115 may be instructed to rotate in a rearward direction at a first rotational speed, and a right drive wheel 115 may be instructed to rotate in a forward direction at substantially the same first rotational speed. In this manner, the AMR 102 may perform a navigation maneuver to turn or rotate in place to the left.

Based on detection of rotation of the rollers 235 in cooperation with respective wheels 115 of the AMR 102, a control system may process the detected or sensed movements of the drive wheels 115 of the AMR 102, and determine corresponding movements of the object 444 using inverse kinematics. In this example, the corresponding movements of the object 444 may comprise an arc 446-3 that moves toward a right side of the AMR 102 and substantially maintains a distance between the object 444 and the AMR 102. Based on the generated or determined corresponding movements, a robotic system may be instructed to move the object 444 along the arc 446-3 relative to the stationary AMR 102 upon the dynamometer 230. Thus, the object 444 may move relative to the stationary AMR 102 in the same manner that the AMR 102 would normally move relative to a stationary object 444, if the AMR 102 were not maintained stationary upon the dynamometer 230 of the example testing system.

During movement of the object 444 by the robotic system, a perception system, e.g., one or more sensors 104, 106, of the AMR 102 may detect, or attempt to detect, the object 444. The control system may receive and process the sensor data received from the sensors 104, 106 of the AMR 102 and determine whether the perception system correctly detected the object 444. Because the AMR 102 is stationary upon the dynamometer 230, and because the control system, via the robotic system, positively controls the position of the object 444 relative to the AMR 102, the sensor data from the sensors 104, 106 of the AMR 102 can be processed and compared to a known or expected location of the object 444, in order to determine whether the perception system correctly detected the object 444.

Further, during movement of the object 444 by the robotic system, a safety, navigation, and/or drive system of the AMR 102 may determine one or more responses to detection of the object 444. For example, the responses may comprise changes or modifications to direction, speed, acceleration, deceleration, turning radius, or other aspects of movement of the AMR 102 via the drive wheels 115. Based on detection of rotation of the rollers 235 in cooperation with respective wheels 115 of the AMR 102, a control system may process the detected or sensed changes or modifications to movements of the drive wheels 115 of the AMR 102, and determine whether the AMR 102 responded correctly to the detected object 444. Again, because the AMR 102 is stationary upon the dynamometer 230, and because the control system, via the robotic system, positively controls the position of the object 444 relative to the AMR 102, the detected or sensed changes or modifications to movements of the drive wheels 115 of the AMR 102 can be processed and compared to a desired or expected response of the AMR 102, in order to determine whether the safety, navigation, and/or drive system responded correctly to the detected object 444. As described herein, the various responses may comprise stopping, accelerating, decelerating, steering or turning, other changes to movement, or combinations thereof.

Using the testing systems and methods described herein, controlled, robust, and repeatable testing of AMRs may be performed under various different test scenarios or situations. By instructing navigation of an AMR under test that is positioned upon a dynamometer, movements of the AMR may be precisely and accurately determined based on data from sensors or encoders associated with the dynamometer. In addition, a robotic system may precisely and accurately control position and movement of an object relative to the AMR under test, based on processing of the data from the sensors or encoders associated with the dynamometer, e.g. using inverse kinematics.

Moreover, the testing systems and methods described herein may controllably and repeatably run the same or different test scenarios or situations multiple times. Further, the testing systems and methods described herein may controllably and repeatably run the same or different test scenarios or situations multiple times with controlled variations or changes, in order to reliably and robustly test such variations or changes. As described further herein, the controlled variations or changes may be associated with attributes of AMRs, attributes of safety, navigation, and/or drive systems, attributes of sensors of perception systems, attributes of detected objects, attributes of environments, and/or various other aspects, attributes, characteristics, and/or conditions of the testing systems and methods described herein.

Although FIG. 4 illustrates a particular number, type, configuration, or arrangement of components of a portion of an example testing system for an autonomous mobile robot, other example embodiments may include various other numbers, types, configurations, or arrangements of components. For example, various different movements or combinations of movements may be instructed for AMRs under test, various types, numbers, combinations, or arrangements of objects may be present, various types of robotic systems may be used to move one or more objects within the environment, and/or various components may be modified, combined, or omitted in other example embodiments of an example testing system for an autonomous mobile robot.

Figure 5:
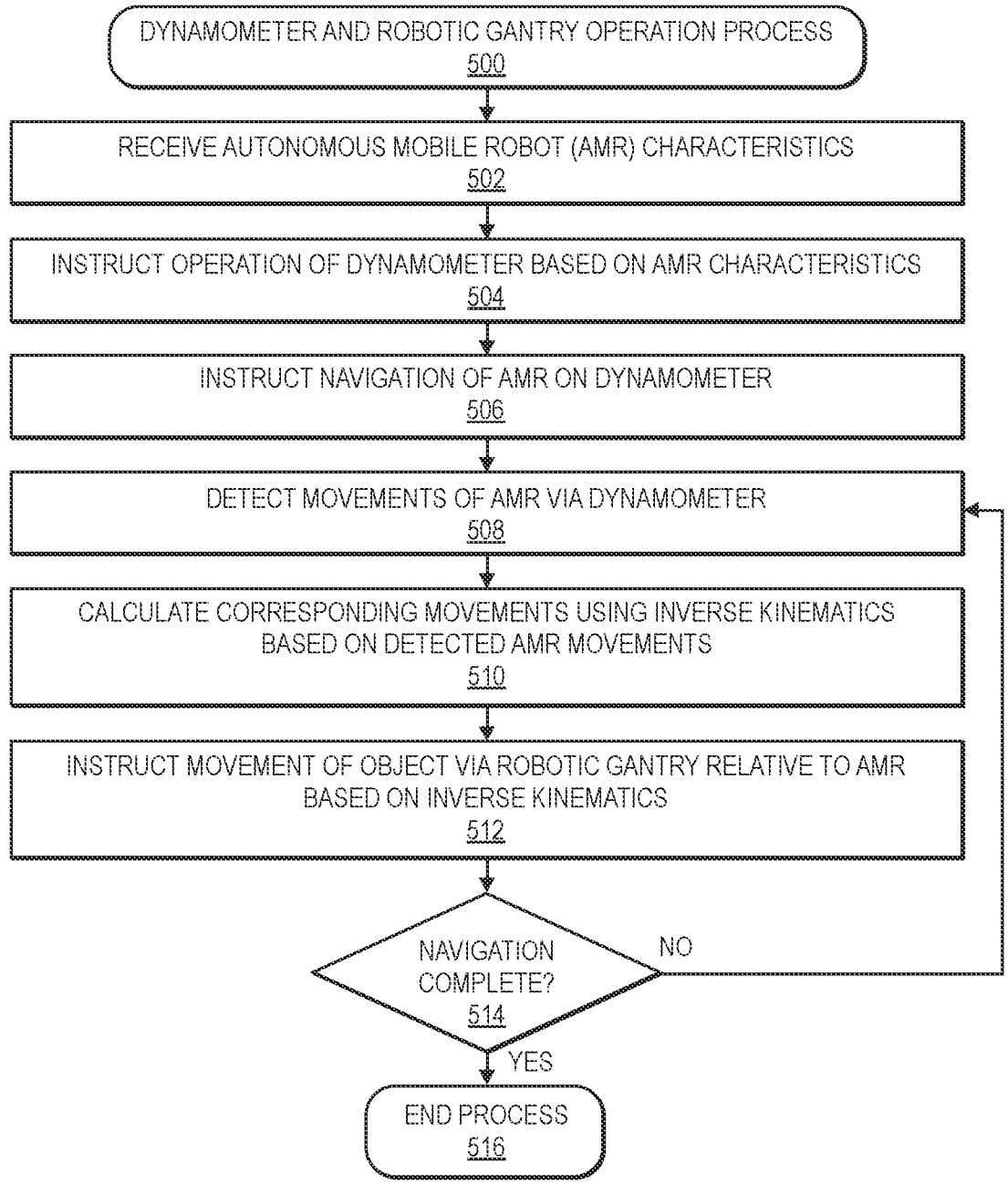
FIG. 5 is a flow diagram illustrating an example dynamometer and robotic gantry operation process, in accordance with implementations of the present disclosure.

FIG. 5 is a flow diagram illustrating an example dynamometer and robotic gantry operation process 500, in accordance with implementations of the present disclosure.

The process 500 may begin by receiving autonomous mobile robot (AMR) characteristics, as at 502. For example, during testing of an AMR, it may be desirable or beneficial to simulate various characteristics of the AMR under test, such as weight, payload, drive torque, acceleration, or other attributes or characteristics of the AMR. In addition, during testing of an AMR, it may also be desirable or beneficial to simulate various characteristics of an environment within which the AMR is operating, such as grades, slopes, surface features, materials, friction properties, or irregularities associated with a surface on which the AMR is navigating. Further, a control system may receive AMR characteristics to be simulated or emulated.

The process 500 may continue by instructing operation of a dynamometer based on the AMR characteristics, as at 504. For example, the AMR under test may be positioned on a dynamometer with one or more rollers, wheels, or drive components of the AMR contacting, engaging, or cooperating with one or more respective rollers, wheels, or other components of the dynamometer. In addition, the one or more rollers or wheels of the dynamometer may apply or generate torques, loads, or other forces to the one or more rollers, wheels, or other drive components of the drive system of the AMR, e.g., using actuators, motors, loads, resistance or friction-generating components, damping components, or various other types of components. Further, a control system may select, determine, and instruct operation of the dynamometer based on the AMR characteristics.

In example embodiments, the applied or generated torques, loads, or other forces may be selected or determined to simulate the various AMR characteristics, such as weight, payload, surface grade, or other navigation surface features. For example, a relatively higher torque, load, or resistance force may be applied by the rollers or wheels of the dynamometer to the drive system of the AMR to simulate a greater weight or payload of the AMR, to simulate movement up an incline or surface grade, and/or to simulate various other AMR characteristics. Likewise, a relatively lower torque, load, or resistance force may be applied by the rollers or wheels of the dynamometer to the drive system of the AMR to simulate a lesser weight or payload of the AMR, to simulate movement down a decline or surface grade, and/or to simulate various other AMR characteristics.

The process 500 may proceed by instructing navigation of the AMR on the dynamometer, as at 506. For example, the AMR may be instructed, programmed, or scripted to perform one or more navigation maneuvers, such as moving forward, moving forward in an arc, turning or rotating, moving rearward, moving rearward in an arc, and/or combinations thereof. In addition, the AMR may be instructed to perform the one or more navigation maneuvers with various directions, speeds, accelerations, decelerations, turns, curves, arcs, rotations, starts, stops, or other aspects of movement. Because the AMR is positioned on the dynamometer, the AMR may remain substantially stationary on the dynamometer while the drive system operates according to the instructed or programmed navigation maneuvers. Further, a control system may instruct or command the AMR to perform one or more navigation maneuvers.

The process 500 may continue to detect movements of the AMR via the dynamometer, as at 508. For example, one or more sensors, imaging sensors, rotation sensors, encoders, rotary encoders, or various other types of sensors may be associated with the rollers or wheels of the dynamometer. The sensors or encoders may detect or sense rotation of the rollers or wheels that are contacting or engaged with respective rollers, wheels, or drive components of the AMR. Further, a control system may receive sensor or encoder data from the sensors or encoders of the dynamometer related to movements of the AMR.

In some example embodiments, because the instructed, programmed, or scripted navigation maneuvers of the AMR may be known, the control system may compare the instructed or commanded navigation maneuvers with the detected or sensed movements of the AMR based on the sensor or encoder data from the dynamometer. Based on the comparison, the control system may determine whether the drive system of the AMR is operating as desired or intended, e.g., whether the drive system precisely and accurately performs the instructed navigation maneuvers. In this manner, the testing systems and methods described herein may also determine whether a drive system of an AMR is operating as expected or intended, or whether there may be problems, defects, or other issues with portions of the drive system that may require maintenance, repair, or replacement.

The process 500 may proceed to calculate corresponding movements using inverse kinematics based on the detected AMR movements, as at 510. For example, based on the sensor or encoder data from the dynamometer related to movements of the AMR, corresponding movements of one or more objects proximate the AMR may be generated or determined that substantially simulate actual movement of the AMR relative to one or more stationary objects. As described herein, because the AMR is substantially stationary upon the dynamometer, if the AMR moves forward a defined distance toward an object in proximity, a corresponding movement of the object toward the AMR may be determined using inverse kinematics. Similarly, if the AMR turns or rotates a defined amount or angle relative to an object in proximity, a corresponding movement or rotation of the object relative to the AMR may be determined using inverse kinematics. Various corresponding combinations of movements and rotations of one or more objects in proximity may be determined using inverse kinematics based on the various combinations of movements of an AMR upon the dynamometer. Further, a control system may calculate or determine corresponding movements of one or more objects using inverse kinematics based on detected AMR movements.

The process 500 may continue with instructing movement of an object via a robotic gantry relative to the AMR based on the inverse kinematics, as at 512. For example, an object proximate the AMR on the dynamometer may be coupled to or carried by a robotic system, such as a robotic gantry system and/or a robotic arm. Based on the determined corresponding movements of the object using inverse kinematics, the robotic system may be instructed to move the object relative to the AMR. By moving the object using the robotic system relative to the substantially stationary AMR, actual movement of the AMR relative to a stationary object may be simulated or emulated. Further, a control system may instruct or command movement of the object via a robotic system relative to the AMR.

Moreover, because the AMR is substantially stationary on the dynamometer, and because movement of the object is precisely and accurately controlled by the robotic system, controlled, robust, and repeatable test scenarios or situations may be performed by the testing systems and methods described herein. As further described herein at least with respect to FIGS. 6 and 7, in example embodiments, the testing systems and methods described herein may be used to test perception systems of AMRs while performing various navigation maneuvers and under various different operating or environment conditions. In additional example embodiments, the testing systems and methods described herein may be used to test safety, navigation, and/or drive systems of AMRs while performing various navigation maneuvers and under various different operating or environment conditions.

The process 500 may proceed with determining whether navigation is complete, as at 514. For example, it may be determined whether the AMR has completed the instructed, programmed, or scripted navigation maneuvers. Further, a control system may determine whether the AMR has completed its navigation.

If the AMR has not yet completed the instructed, programmed, or scripted navigation maneuvers, the process 500 may return to step 508 to continue to detect movements of the AMR, calculate corresponding movements of an object using inverse kinematics, and instruct movement of the object by a robotic system. If, however, it is determined that the AMR has completed the instructed, programmed, or scripted navigation maneuvers, the process 500 may then end, as at 516.

Figure 6:
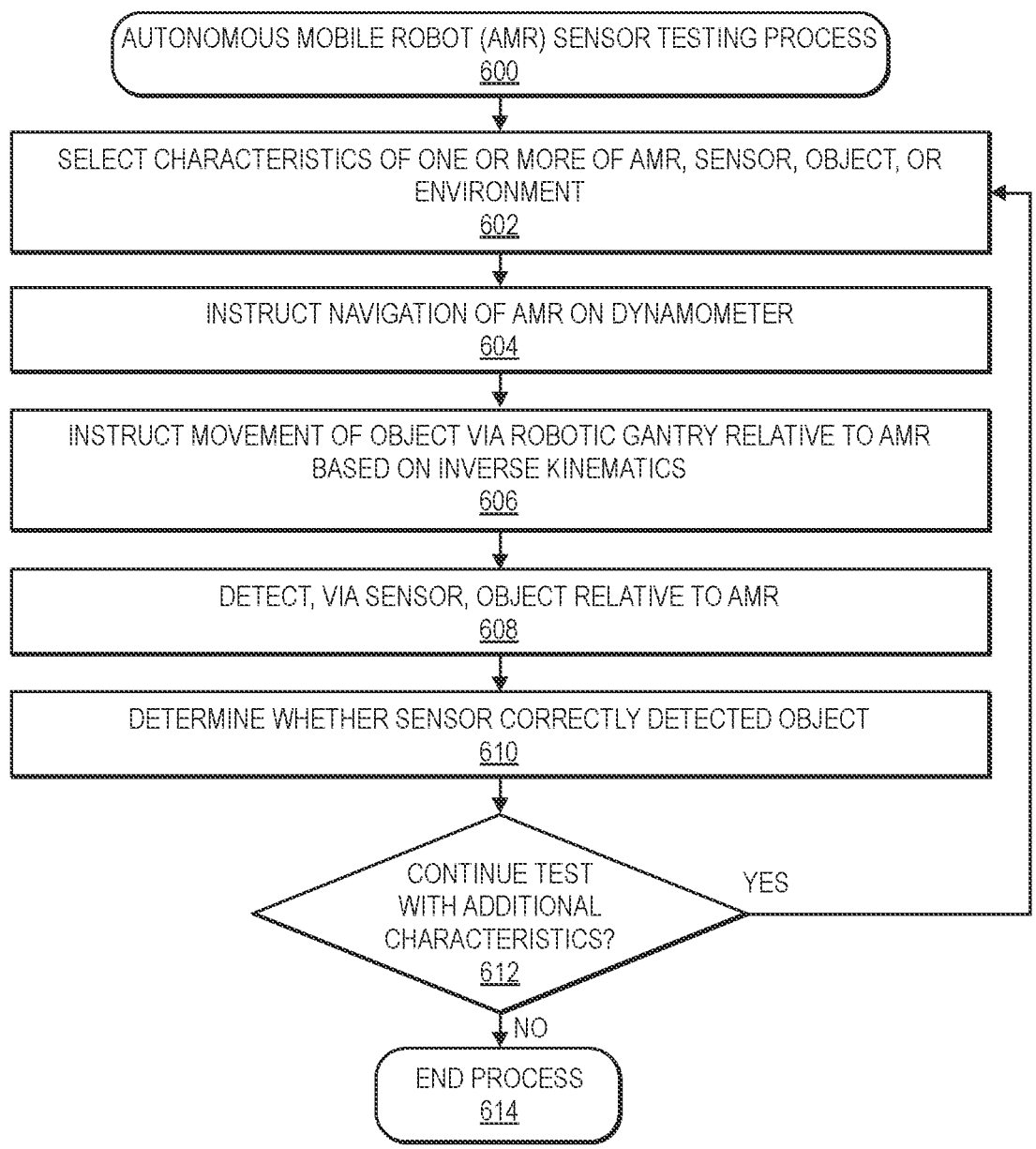
FIG. 6 is a flow diagram illustrating an example autonomous mobile robot sensor testing process, in accordance with implementations of the present disclosure.

FIG. 6 is a flow diagram illustrating an example autonomous mobile robot sensor testing process 600, in accordance with implementations of the present disclosure.

The process 600 may begin by selecting characteristics of one or more of an autonomous mobile robot (AMR), sensor, object, or environment, as at 602. For example, during testing of an AMR, it may be determined to test various characteristics of the AMR under test, such as weight, payload, drive torque, acceleration, or other attributes or characteristics of the AMR. In addition, it may also be determined to test various characteristics of an environment within which the AMR is operating, such as grades, slopes, surface features, materials, friction properties, or irregularities associated with a surface on which the AMR is navigating. Further, it may be determined to test one or more characteristics of sensors of a perception system of the AMR, such as sensor hardware, sensor capabilities, various sensor attributes, sensor manufacturing variability, software or firmware associated with sensor functions or operations, and/or various other attributes or characteristics of sensors. Moreover, it may be determined to test one or more characteristics of objects to be detected, such as type, number, size, shape, color, material, surface features or textures, reflectivity, other visual attributes, motion attributes such as direction, speed, acceleration, or others, and/or other attributes or characteristics. Furthermore, it may be determined to test one or more characteristics of an environment, such as lighting conditions, temperature, humidity, air quality, or other attributes or characteristics. Further, a control system may select, determine, or receive characteristics of one or more of an AMR, sensor, object, or environment to be tested.

The process 600 may continue by instructing navigation of the AMR on the dynamometer, as at 604. For example, while positioned on a dynamometer, the AMR may be instructed, programmed, or scripted to perform one or more navigation maneuvers, such as moving forward, moving forward in an arc, turning or rotating, moving rearward, moving rearward in an arc, and/or combinations thereof. In addition, the AMR may be instructed to perform the one or more navigation maneuvers with various directions, speeds, accelerations, decelerations, turns, curves, arcs, rotations, starts, stops, or other aspects of movement. Because the AMR is positioned on the dynamometer, the AMR may remain substantially stationary on the dynamometer while the drive system operates according to the instructed or programmed navigation maneuvers. Furthermore, as described herein, one or more rollers or wheels of the dynamometer may apply or generate torques, loads, or other forces to the one or more rollers, wheels, or other drive components of the drive system of the AMR, e.g., using actuators, motors, loads, resistance or friction-generating components, damping components, or various other types of components, which may simulate various AMR and/or navigation surface characteristics. Further, a control system may instruct or command the AMR to perform one or more navigation maneuvers.

The process 600 may proceed by instructing movement of an object via a robotic gantry relative to the AMR based on the inverse kinematics, as at 606. For example, an object proximate the AMR on the dynamometer may be coupled to or carried by a robotic system, such as a robotic gantry system and/or a robotic arm. One or more sensors or encoders associated with the dynamometer may detect or sense rotation of rollers or wheels that are contacting or engaged with respective rollers, wheels, or drive components of the AMR. Then, corresponding movements of an object proximate the AMR may be generated or determined using inverse kinematics based on the sensor or encoder data from the dynamometer. Based on the determined corresponding movements of the object using inverse kinematics, the robotic system may be instructed to move the object relative to the AMR. By moving the object using the robotic system relative to the substantially stationary AMR, actual movement of the AMR relative to a stationary object may be simulated or emulated. Further, a control system may instruct or command movement of the object via a robotic system relative to the AMR.

The process 600 may then continue to detect, via a sensor, an object relative to the AMR, as at 608. For example, one or more sensors of a perception system of the AMR may detect, or attempt to detect, the object proximate the AMR that is carried and/or moved by the robotic system. The various sensors may comprise imaging sensors, stereo imaging devices, light detection and ranging (LIDAR) sensors, radar sensors, proximity sensors, other types of time-of-flight sensors, RFID readers or sensors, or other types of sensors. The various selected characteristics at step 602 of the process 600 may affect and/or test the detection functions or operations of the sensors, including various hardware, capabilities, software, or other attributes of the sensors, visual, motion, or other attributes of the object, and/or lighting, air quality, or other attributes or conditions of the environment. Further, a control system may instruct or control operation of one or more sensors of a perception system of the AMR.

The process 600 may proceed to determine whether the sensor correctly detected the object, as at 610. For example, because the AMR 102 is stationary upon the dynamometer 230, because movements of the AMR are accurately and precisely controlled via programmed or scripted navigation maneuvers, and because the robotic system accurately and precisely controls movement of the object relative to the AMR, the position or movement of the object relative to the AMR, e.g., relative to the perception system of the AMR, may be known, expected, or defined. Then, sensor data received from the sensor may be processed to determine a position or movement of the detected object, which may be compared with the known or expected position or movement of the object, in order to determine whether the sensor correctly detected the object. As described herein, various attributes of the AMR, sensors, objects, and/or environment may be modified or changed in order to test detection capabilities and functions of one or more sensors of a perception system of an AMR. Further, a control system may determine whether a sensor correctly detected an object.

In some example embodiments, if a sensor fails to correctly detect an object proximate the AMR, various actions or corrections may be undertaken to resolve the problems, errors, or issues. For example, various attributes of an AMR may be modified or improved, different types of sensors may be utilized for AMRs when in proximity to objects having certain attributes and/or under certain environment conditions, various operations of an AMR may be modified when in proximity to objects having certain attributes and/or under certain environment conditions, various attributes of sensors may be modified to improve or adjust associated functions or operations, various types of sensors may be designated to detect objects having certain attributes and/or under certain environment conditions, various types of sensors may be disfavored for detecting objects having certain attributes and/or under certain environment conditions, various visual attributes of objects may be removed or minimized in certain environments, various attributes of an environment may be more strictly or tightly controlled to facilitate AMR operations, and/or various other actions or corrections to address problems, errors, or issues associated with perception systems of AMRs may be undertaken.

The process 600 may continue with determining whether to continue testing with additional characteristics, as at 612. For example, it may be determined whether to test perception functions or operations subject to various other attributes or characteristics associated with AMRs, sensors, objects, and/or environments. Further, a control system may determine whether to continue testing with additional characteristics.

If testing with additional characteristics is desired, the process 600 may return to step 602 to select one or more additional attributes or characteristics associated with AMRs, sensors, objects, and/or environments in order to test perception functions or operations. If, however, it is determined that no additional testing is desired, the process 600 may then end, as at 614.

Figure 7:
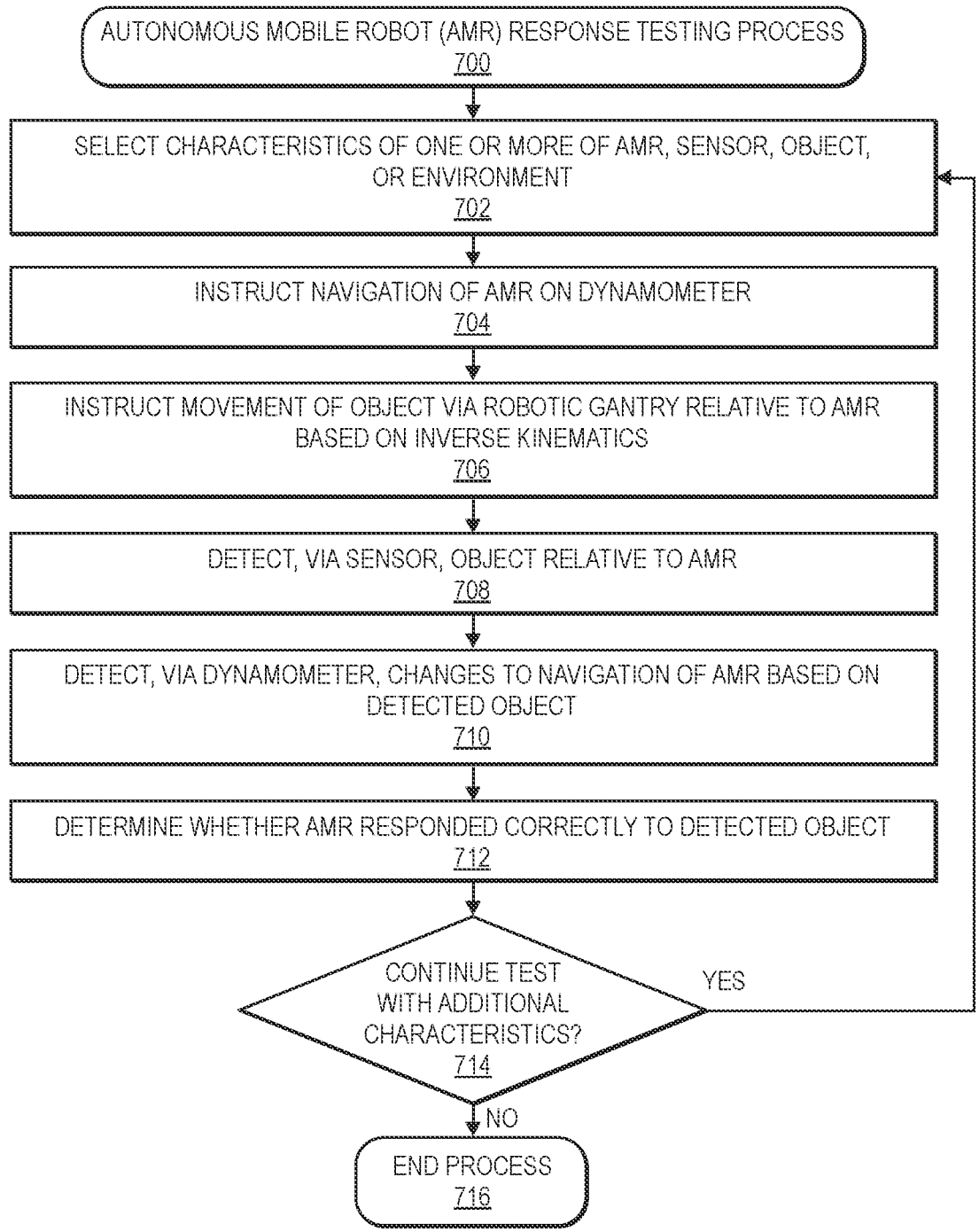
FIG. 7 is a flow diagram illustrating an example autonomous mobile robot response testing process, in accordance with implementations of the present disclosure.

FIG. 7 is a flow diagram illustrating an example autonomous mobile robot response testing process 700, in accordance with implementations of the present disclosure.

The process 700 may begin by selecting characteristics of one or more of an autonomous mobile robot (AMR), sensor, object, or environment, as at 702. For example, during testing of an AMR, it may be determined to test various characteristics of the AMR under test, such as weight, payload, drive torque, acceleration, or other attributes or characteristics of the AMR. In addition, it may also be determined to test various characteristics of an environment within which the AMR is operating, such as grades, slopes, surface features, materials, friction properties, or irregularities associated with a surface on which the AMR is navigating. Further, it may be determined to test one or more characteristics of sensors of a perception system of the AMR, such as sensor hardware, sensor capabilities, various sensor attributes, sensor manufacturing variability, software or firmware associated with sensor functions or operations, and/or various other attributes or characteristics of sensors. Moreover, it may be determined to test one or more characteristics of objects to be detected, such as type, number, size, shape, color, material, surface features or textures, reflectivity, other visual attributes, motion attributes such as direction, speed, acceleration, or others, and/or other attributes or characteristics. Furthermore, it may be determined to test one or more characteristics of an environment, such as lighting conditions, temperature, humidity, air quality, or other attributes or characteristics. Further, a control system may select, determine, or receive characteristics of one or more of an AMR, sensor, object, or environment to be tested.

The process 700 may continue by instructing navigation of the AMR on the dynamometer, as at 704. For example, while positioned on a dynamometer, the AMR may be instructed, programmed, or scripted to perform one or more navigation maneuvers, such as moving forward, moving forward in an arc, turning or rotating, moving rearward, moving rearward in an arc, and/or combinations thereof. In addition, the AMR may be instructed to perform the one or more navigation maneuvers with various directions, speeds, accelerations, decelerations, turns, curves, arcs, rotations, starts, stops, or other aspects of movement. Because the AMR is positioned on the dynamometer, the AMR may remain substantially stationary on the dynamometer while the drive system operates according to the instructed or programmed navigation maneuvers. Furthermore, as described herein, one or more rollers or wheels of the dynamometer may apply or generate torques, loads, or other forces to the one or more rollers, wheels, or other drive components of the drive system of the AMR, e.g., using actuators, motors, loads, resistance or friction-generating components, damping components, or various other types of components, which may simulate various AMR and/or navigation surface characteristics. Further, a control system may instruct or command the AMR to perform one or more navigation maneuvers.

The process 700 may proceed by instructing movement of an object via a robotic gantry relative to the AMR based on the inverse kinematics, as at 706. For example, an object proximate the AMR on the dynamometer may be coupled to or carried by a robotic system, such as a robotic gantry system and/or a robotic arm. One or more sensors or encoders associated with the dynamometer may detect or sense rotation of rollers or wheels that are contacting or engaged with respective rollers, wheels, or drive components of the AMR. Then, corresponding movements of an object proximate the AMR may be generated or determined using inverse kinematics based on the sensor or encoder data from the dynamometer. Based on the determined corresponding movements of the object using inverse kinematics, the robotic system may be instructed to move the object relative to the AMR. By moving the object using the robotic system relative to the substantially stationary AMR, actual movement of the AMR relative to a stationary object may be simulated or emulated. Further, a control system may instruct or command movement of the object via a robotic system relative to the AMR.

The process 700 may then continue to detect, via a sensor, an object relative to the AMR, as at 708. For example, one or more sensors of a perception system of the AMR may detect, or attempt to detect, the object proximate the AMR that is carried and/or moved by the robotic system. The various sensors may comprise imaging sensors, stereo imaging devices, light detection and ranging (LIDAR) sensors, radar sensors, proximity sensors, other types of time-of-flight sensors, RFID readers or sensors, or other types of sensors. The various selected characteristics at step 702 of the process 700 may affect and/or test the detection functions or operations of the sensors, including various hardware, capabilities, software, or other attributes of the sensors, visual, motion, or other attributes of the object, and/or lighting, air quality, or other attributes or conditions of the environment, as further described at least with respect to FIG. 6. Further, a control system may instruct or control operation of one or more sensors of a perception system of the AMR.

The process 700 may proceed to detect, via the dynamometer, changes to navigation of the AMR based on the detected object, as at 710. For example, one or more sensors, imaging sensors, rotation sensors, encoders, rotary encoders, or various other types of sensors may be associated with the rollers or wheels of the dynamometer. The sensors or encoders may detect or sense changes to movement or rotation of the rollers or wheels that are contacting or engaged with respective rollers, wheels, or drive components of the AMR. In addition, the changes to movement or rotation may comprise one or more safety or navigation responses performed or executed by the AMR in response to detection of the object proximate the AMR. Example responses may comprise stopping movement of the AMR, slowing or accelerating movement of the AMR, steering, turning, or rotating the AMR, and/or combinations thereof. In addition, example responses may comprise various changes or modifications to direction, speed, acceleration, deceleration, turning radius, or other aspects of movement of the AMR. Furthermore, other example responses may comprise various changes, adjustments, or modifications to one or more other portions of the AMR, such as raising or lowering a lift mechanism, actuating or moving a portion of a modular attachment such as a conveyor section or robotic arm, and/or changes to other portions of the AMR. Further, a control system may receive changes to movement or navigation of the AMR based on a detected object.

The process 700 may continue with determining whether the AMR responded correctly to the detected object, as at 712. For example, because the AMR 102 is stationary upon the dynamometer 230, because movements of the AMR are accurately and precisely controlled and detected via the dynamometer, and because the robotic system accurately and precisely controls movement of the object relative to the AMR, expected or predicted responses of an AMR in response to a detected object may be known or defined. Then, sensor or encoder data from the dynamometer may be processed to determine changes to movement or navigation of the AMR in response to a detected object, which may be compared with the known or defined responses, in order to determine whether the AMR responded correctly to the detected object. Based on the comparison, the control system may determine whether the safety, navigation, and/or drive system of the AMR is responding as desired or intended, e.g., whether the drive system precisely and accurately performs one or more navigation maneuvers associated with a safety or navigation response. As described herein, various attributes of the AMR, sensors, objects, and/or environment may be modified or changed in order to test safety, navigation, and/or drive responses of an AMR in response to one or more detected objects. Further, a control system may determine whether an AMR responded correctly to a detected object.

In example embodiments, the testing systems and methods described herein may comprise testing of hardware or capabilities of portions of the safety, navigation, drive, and/or other systems of AMRs, such as motors, actuators, wheels, brakes, or others. In addition, the testing systems and methods described herein may comprise testing of software or firmware associated with functions or operations of safety, navigation, drive, and/or other systems of AMRs. Further, the testing systems and methods described herein may comprise testing of manufacturing variability among multiple AMRs, and/or multiple variations or models of AMRs having different hardware, software, and/or capabilities.

As described herein, the example responses of an AMR in response to a detected object may comprise various types of responses, such as stopping, accelerating or decelerating, turning or rotating, or others. In some example embodiments, one or more of the various types of responses may be made available or unavailable to an AMR under test, e.g., by modifying software or firmware of the AMR, such that controlled, robust, and repeatable testing of one or more particular responses may be performed or executed. Such modifications may allow directed testing of one or more particular responses as desired, rather than broader or more holistic testing of selection and performance of one or more responses by AMRs.

In further example embodiments, slip or loss of friction or grip by one or more drive wheels of an AMR may be included as part of testing of responses of AMRs. As described herein, one or more sensors or encoders associated with a drive system of an AMR may detect movement or rotation of a drive wheel, and one or more sensors or encoders associated with a dynamometer may detect movement or rotation of a corresponding roller. Any differences between the detected movement or rotation of the drive wheel and the corresponding roller may signify wheel slip or loss of friction or grip between the two. In some examples, while an AMR performs or executes a safety, navigation, and/or drive response to a detected object, wheel slip may be detected, and one or more actions or corrections may be undertaken to reduce or minimize wheel slip in such test scenarios or situations. In other examples, wheel slip may be intentionally generated or created by controlling torques, loads, or forces applied to the drive wheels by the rollers of the dynamometer, and responses by the AMR to the detected wheel slip may be detected and processed to determine whether the AMR has responded correctly to such test scenarios or situations.

In example embodiments, if an AMR does not respond correctly to a detected object proximate the AMR, various actions or corrections may be undertaken to resolve the problems, errors, or issues. For example, various attributes of an AMR may be modified or improved, different types of hardware or components may be selected to improve responses by AMRs, various functions or operations in software or firmware of an AMR may be modified to improve responses by AMRs, various navigation surface features or textures may be favored or disfavored to facilitate AMR responses and operations, various attributes of an environment may be more strictly or tightly controlled to facilitate AMR responses and operations, and/or various other actions or corrections to address problems, errors, or issues associated with safety, navigation, and/or drive systems of AMRs may be undertaken.

The process 700 may continue with determining whether to continue testing with additional characteristics, as at 714. For example, it may be determined whether to test safety, navigation, and/or drive response functions or operations subject to various other attributes or characteristics associated with AMRs, sensors, objects, and/or environments. Further, a control system may determine whether to continue testing with additional characteristics.

If testing with additional characteristics is desired, the process 700 may return to step 702 to select one or more additional attributes or characteristics associated with AMRs, sensors, objects, and/or environments in order to test safety, navigation, and/or drive response functions or operations. If, however, it is determined that no additional testing is desired, the process 700 may then end, as at 716.

FIG. 8 is a block diagram illustrating various components of an example autonomous mobile robot (AMR) control system 800, in accordance with implementations of the present disclosure.

In various examples, the block diagram may be illustrative of one or more aspects of the AMR controller or control system 800 that may be used to implement the various systems and processes discussed above. In the illustrated implementation, the AMR control system 800 includes one or more processors 802, coupled to a non-transitory computer-readable storage medium 820 via an input/output (I/O) interface 810. The AMR control system 800 may also include a drive mechanism controller 804 and a power supply or battery 806. The AMR control system 800 may further include a lift mechanism controller 812, a safety system controller 813, a navigation system controller 814, a network interface 816, and one or more input/output devices 817.

In various implementations, the AMR control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer-readable storage medium 820 may be configured to store executable instructions, applications, drivers, and/or data, such as AMR data, attributes, or characteristics, hardware or component data, perception system data, drive mechanism data, safety system data, navigation system data, sensor data, encoder data, detected object data, lift mechanism data, other sensor data, and/or other data items accessible by the processor(s) 802. In various implementations, the non-transitory computer-readable storage medium 820 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822 and data storage 824. In other implementations, program instructions, applications, drivers, and/or data may be received, sent or stored upon different types of computer-accessible media, such as non-transitory media, or on similar media separate from the non-transitory computer-readable storage medium 820 or the AMR control system 800.

Generally, a non-transitory, computer-readable storage medium 820 may include storage media or memory media such as magnetic or optical media, e.g., disk or CD/DVD-ROM, coupled to the AMR control system 800 via the I/O interface 810. Program instructions and data stored via a non-transitory computer-readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer-readable storage medium 820, and any peripheral devices, the network interface 816 or other peripheral interfaces, such as input/output devices 817. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer-readable storage medium 820, may be incorporated directly into the processor(s) 802.

The drive mechanism controller 804 may communicate with the processor(s) 802, the non-transitory computer-readable storage medium 820, the safety system controller 813, the navigation system controller 814, and/or other components described herein to adjust the operational characteristics of motors or other actuators associated with each drive mechanism to move the AMR along a determined path to a destination and/or to perform other navigational maneuvers or operations, including moving forward, moving forward in an arc, turning or rotating, moving rearward, moving rearward in an arc, moving in a desired direction, moving at a desired speed, moving with a desired acceleration, and/or various combinations thereof.

The AMR control system 800 may also include a lift mechanism controller 812 that communicates with the processor(s) 802, the non-transitory computer-readable storage medium 820, and/or other components described herein to engage, couple, lift, receive, load, move, and/or unload one or more items, containers, packages, loads, or other objects.

The AMR control system 800 may also include a safety system controller 813 that communicates with the processor(s) 802, the drive mechanism controller 804, the non-transitory computer readable storage medium 820, one or more sensors, the navigation system controller 814, and/or other components described herein. The safety system controller 813 may include or be in communication with the one or more sensors of a perception system, may detect one or more objects in proximity to the AMR, may select, determine, and/or instruct one or more responses by the AMR in response to the detected objects, e.g., to maintain desired separation distances from detected objects, and/or to avoid or prevent impact or contact with detected objects, and/or may perform various other operations described herein.

The AMR control system 800 may also include a navigation system controller 814 that communicates with the processor(s) 802, the drive mechanism controller 804, the non-transitory computer-readable storage medium 820, the safety system controller 813, and/or other components described herein. The navigation system controller 814 may instruct or command movements of the AMR according to programmed or scripted navigation maneuvers, may instruct or command modifications or changes to movement characteristics according to one or more safety, navigation, and/or drive responses of the AMR in response to one or more detected objects, and/or may perform various other operations described herein.

The network interface 816 may be configured to allow data to be exchanged between the AMR control system 800, other devices attached to a network, such as other computer systems, control systems, management control systems, controllers or control systems of other AMRs, and/or other vehicles, systems, machines, equipment, apparatuses, systems, sensors, or devices associated with various environments. For example, the network interface 816 may enable wireless communication between numerous AMRs, and/or between individual AMRs and a control system. In various implementations, the network interface 816 may support communication via wireless general data networks, such as a Wi-Fi network. For example, the network interface 816 may support communication via telecommunications networks such as cellular communication networks, satellite networks, and the like.

Input/output devices 817 may, in some implementations, include one or more visual input/output devices, audio input/output devices, displays, imaging sensors, thermal sensors, infrared sensors, LIDAR, radar, or other time of flight sensors, GPS sensors, indoor positioning system sensors, position encoders, speedometers, inertial measurement units, accelerometers, gyroscopes, weight, load, or pressure sensors, various other sensors described herein, etc. Multiple input/output devices 817 may be present and controlled by the AMR control system 800. One or more of these sensors may be utilized to assist in performing the various functions, operations, and processes described herein.

As shown in FIG. 8, the memory may include program instructions 822 which may be configured to implement the example processes and/or sub-processes described above. The data storage 824 may include various data stores for maintaining data items that may be provided for performing the various functions, operations, and processes described herein. For example, the data storage 824 may include AMR data, attributes, or characteristics, hardware or component data, perception system data, drive mechanism data, safety system data, navigation system data, sensor data, encoder data, detected object data, lift mechanism data, other sensor data, and/or other data items.

Those skilled in the art will appreciate that the AMR control system 800 is merely illustrative and is not intended to limit the scope of the present disclosure. In particular, the computing system and devices may include any combination of hardware or software that can perform the indicated functions, including other control systems or controllers, computers, network devices, robotic devices, etc. The AMR control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to ground-based vehicles, the disclosed implementations may also be used for other forms of vehicles, including, but not limited to, aerial vehicles, water-based vehicles, or other types of vehicles or autonomous robots.

Figure 9:
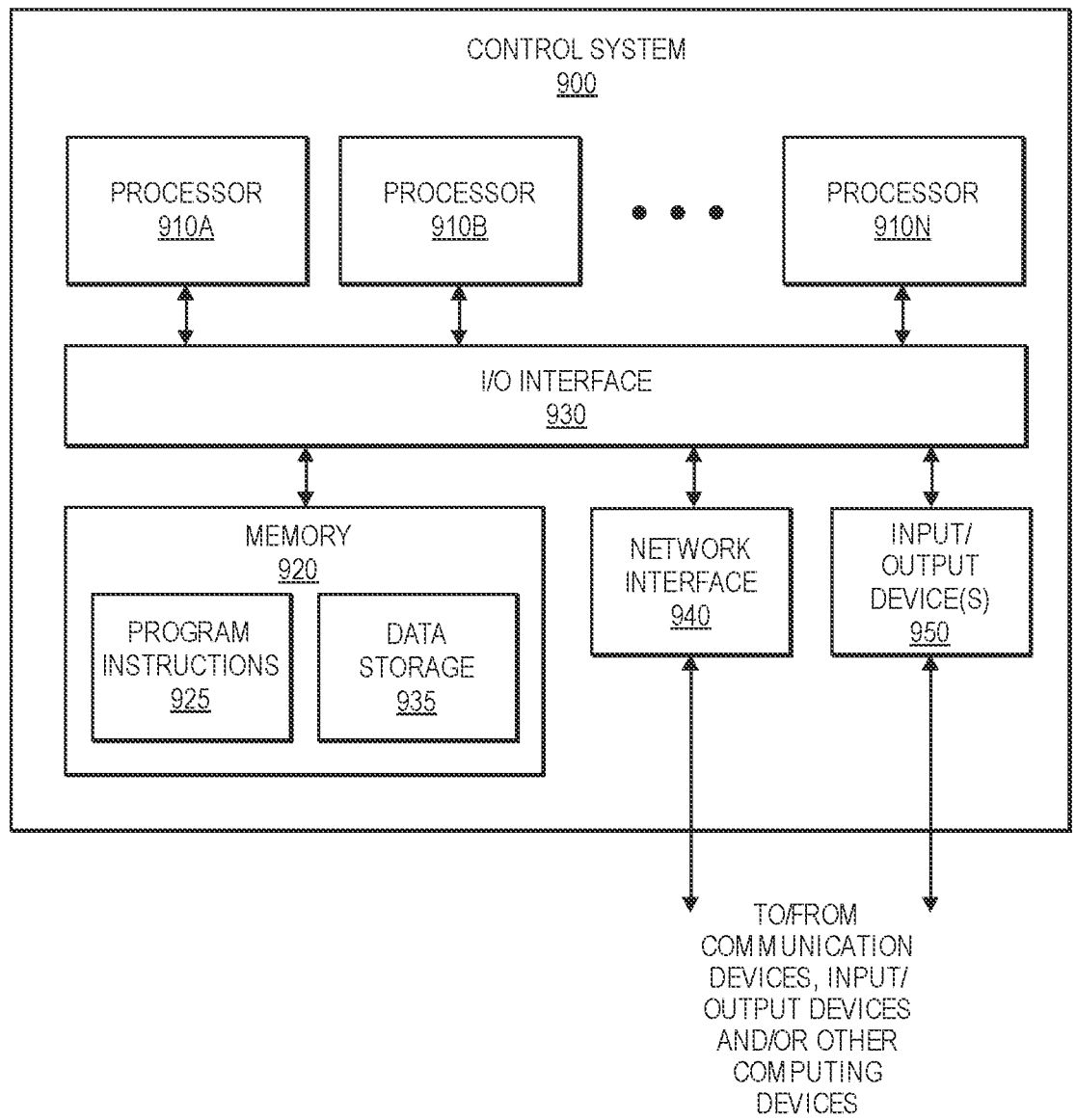
FIG. 9 is a block diagram illustrating various components of an example control system, in accordance with implementations of the present disclosure.

FIG. 9 is a block diagram illustrating various components of an example control system 900, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 9. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of AMR testing systems, operations, or processes, etc.) may be implemented via one or more nodes of the control system 900 that are distinct from those nodes implementing other data sources or services (e.g., related to other portions of AMR testing systems, operations, or processes, etc.).

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other control systems, material handling system controllers, warehouse management systems, other computer systems, AMR control systems, various types of sensors, other material handling systems or equipment, or between nodes of the control system 900. In various implementations, the network interface 940 may support communication via wired or wireless general data networks, such as any suitable type of Ethernet network.

Input/output devices 950 may, in some implementations, include one or more visual input/output devices, displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate functions or operations described herein, such as AMR controllers, drivers, or applications, sensor controllers, drivers, or applications, sensor data processing applications, encoder controllers, drivers, or applications, encoder data processing applications, dynamometer controllers, drivers, or applications, robotic system, gantry, and/or arm controllers, drivers, or applications, enclosure controllers, drivers, or applications, environment controllers, drivers, or applications, etc. The data storage 935 may include various data stores for maintaining data related to systems, operations, or processes described herein, such as AMRs, sensors, sensor data, encoders, encoder data, dynamometers, robotic systems, gantries, and/or arms, enclosures, objects, environments, etc.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A testing system for an autonomous mobile robot, comprising:
   a dynamometer;
   the autonomous mobile robot having a differential drive system and a perception system, the autonomous mobile robot being positioned on the dynamometer;
   a robotic gantry system configured to move an object relative to the autonomous mobile robot;
   an enclosure substantially surrounding the dynamometer and the robotic gantry system; and
   a control system configured to at least:
      instruct navigation of the autonomous mobile robot;
      receive, via the dynamometer, movements of the differential drive system of the autonomous mobile robot;
      calculate, using inverse kinematics, corresponding movements of the object based on the movements of the differential drive system of the autonomous mobile robot;
      instruct movement of the object by the robotic gantry system relative to the autonomous mobile robot based on the inverse kinematics;
      instruct adjustment of a characteristic of the object, the characteristic of the object comprising at least one of material, texture, or reflectivity;
      receive, via the perception system, sensor data associated with the object moved by the robotic gantry system; and
      process the sensor data to determine that the perception system correctly detected the object.

2. The testing system of claim 1, wherein the control system is further configured to at least:
   receive, via the dynamometer, response movements of the differential drive system of the autonomous mobile robot based on detection of the object by the perception system;
   process the response movements to determine that the autonomous mobile robot correctly responded to the detection of the object.

3. The testing system of claim 1, wherein the perception system comprises at least one of stereo imaging devices or light detection and ranging (LIDAR) sensors.

4. The testing system of claim 1, wherein the characteristic of the object further comprises at least one of a motion or a color; and
   wherein the control system is further configured to at least:
      instruct adjustment of a characteristic of an environment within the enclosure, the characteristic of the environment comprising at least one of lighting, humidity, or air quality.

5. An apparatus, comprising:
   a dynamometer configured to receive an autonomous mobile robot under test, the autonomous mobile robot including a differential drive system and a perception system;
   a robotic system configured to move an object relative to the dynamometer; and
   a control system configured to at least:
      instruct navigation of the autonomous mobile robot under test;
      receive, via the dynamometer, movements of the differential drive system of the autonomous mobile robot;
      determine, using inverse kinematics, corresponding movements of the object based on the movements of the differential drive system of the autonomous mobile robot;
      instruct movement of the object by the robotic system relative to the autonomous mobile robot based on the inverse kinematics; and
      instruct adjustment of a characteristic of the object, the characteristic of the object comprising at least one of material, texture, or reflectivity.

6. The apparatus of claim 5, wherein the dynamometer comprises wheels or rollers configured to contact and rotate with wheels of the differential drive system of the autonomous mobile robot.

7. The apparatus of claim 5, wherein the control system is further configured to at least:
   receive characteristics of the autonomous mobile robot; and
   instruct actuation of the dynamometer based on the characteristics of the autonomous mobile robot;
   wherein the characteristics of the autonomous mobile robot comprise at least one of weight, payload, friction, surface grade, or navigation surface features.

8. The apparatus of claim 5, wherein the perception system comprises at least one of imaging devices, stereo imaging devices, light detection and ranging (LIDAR) sensors, or radar sensors.

9. The apparatus of claim 5, wherein the control system is further configured to at least:
   receive, via the perception system, sensor data associated with the object moved by the robotic system; and
   process the sensor data to determine that the perception system correctly detected the object.

10. The apparatus of claim 9, wherein the characteristic of the object further comprises at least one of a motion or a color.

11. The apparatus of claim 10, wherein the characteristic of the object includes the motion of the object; and
    wherein the movement of the object by the robotic system relative to the autonomous mobile robot further includes the motion of the object.

12. The apparatus of claim 9, wherein the control system is further configured to at least:
    instruct adjustment of a characteristic of an environment proximate the dynamometer, the characteristic of the environment comprising at least one of lighting, humidity, or air quality.

13. The apparatus of claim 9, wherein the control system is further configured to at least:
    receive, via the dynamometer, response movements of the differential drive system of the autonomous mobile robot based on detection of the object by the perception system;
    process the response movements to determine that the autonomous mobile robot correctly responded to the detection of the object.

14. The apparatus of claim 13, wherein the response movements of the differential drive system of the autonomous mobile robot comprise at least one of stopping, accelerating, or steering.

15. The apparatus of claim 5, wherein the robotic system comprises a robotic arm coupled to an overhead robotic gantry system, wherein the robotic arm is configured to grasp the object, and wherein the overhead robotic gantry system and the robotic arm are configured to move the object relative to the dynamometer.

16. The apparatus of claim 5, further comprising:

an enclosure substantially surrounding the dynamometer and the robotic system;

wherein the enclosure includes at least one of a color, material, texture, or reflectivity so as to be undetected by the perception system of the autonomous mobile robot.

17. A method, comprising:

instructing, by a control system, navigation of an autonomous mobile robot under test that is positioned on a dynamometer, the autonomous mobile robot including a differential drive system and a perception system;

receiving, by the control system via the dynamometer, movements of the differential drive system of the autonomous mobile robot;

determining, by the control system using inverse kinematics, corresponding movements of an object based on the movements of the differential drive system of the autonomous mobile robot;

instructing, by the control system via a robotic system, movement of the object carried by the robotic system relative to the autonomous mobile robot based on the inverse kinematics; and instructing, by the control system, adjustment of a characteristic of the object, the characteristic of the object comprising at least one of material, texture, or reflectivity.

18. The method of claim 17, wherein the characteristic of the object further comprises at least one of a motion or a color, and further comprising:

instructing, by the control system, adjustment of a characteristic of an environment proximate the dynamometer, the characteristic of the environment comprising at least one of lighting, humidity, or air quality.

19. The method of claim 17, further comprising:

receiving, by the control system via the perception system, sensor data associated with the object moved by the robotic system; and processing, by the control system, the sensor data to determine that the perception system correctly detected the object.

20. The method of claim 17, further comprising:

receiving, by the control system via the dynamometer, response movements of the differential drive system of the autonomous mobile robot based on detection of the object by the perception system; and processing, by the control system, the response movements to determine that the autonomous mobile robot correctly responded to the detection of the object.

* * * * *